United States Patent
Zhang et al.

(10) Patent No.: US 11,199,414 B2
(45) Date of Patent: Dec. 14, 2021

(54) METHOD FOR SIMULTANEOUS LOCALIZATION AND MAPPING

(71) Applicant: ZHEJIANG UNIVERSITY, Hangzhou (CN)

(72) Inventors: Guofeng Zhang, Hangzhou (CN); Hujun Bao, Hangzhou (CN); Haomin Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 363 days.

(21) Appl. No.: 16/333,240

(22) PCT Filed: Sep. 14, 2016

(86) PCT No.: PCT/CN2016/098990
§ 371 (c)(1),
(2) Date: Mar. 14, 2019

(87) PCT Pub. No.: WO2018/049581
PCT Pub. Date: Mar. 22, 2018

(65) Prior Publication Data
US 2019/0234746 A1   Aug. 1, 2019

(51) Int. Cl.
*G01C 21/32* (2006.01)
*G06T 7/70* (2017.01)
(Continued)

(52) U.S. Cl.
CPC .............. *G01C 21/32* (2013.01); *G01C 21/16* (2013.01); *G06K 9/00* (2013.01); *G06T 7/246* (2017.01);
(Continued)

(58) Field of Classification Search
USPC ....................................................... 702/105
See application file for complete search history.

(56) References Cited

U.S. PATENT DOCUMENTS 8,946,606 B1 *   2/2015   Dennison .............. F41G 7/2293
                                                  244/3.16
2010/0045701 A1 * 2/2010   Scott ...................... H04N 7/183
                                                     345/633

FOREIGN PATENT DOCUMENTS

CN    103530881 A    1/2014
CN    104881869 A    9/2015
(Continued)

OTHER PUBLICATIONS

International Search Report (PCT/CN2016/098990); dated Jul. 10, 2017.

*Primary Examiner* — Amir Shahnami
(74) *Attorney, Agent, or Firm* — W&G Law Group (57) ABSTRACT

A method for simultaneous localization and mapping is provided, which can reliably handle strong rotation and fast motion. The method provided a simultaneous localization and mapping algorithm framework based on a key frame, which can support rapid local map extension. Under this framework, a new feature tracking method based on multiple homography matrices is provided, and this method is efficient and robust under strong rotation and fast motion. A camera orientation optimization framework based on a sliding window is further provided to increase motion constraint between successive frames with simulated or actual IMU data. Finally, a method for obtaining a real scale of a specific plane and scene is provided in such a manner that a virtual object is placed on a specific plane in real size.

7 Claims, 4 Drawing Sheets

(51) Int. Cl.
*G01C 21/16* (2006.01)
*G06T 7/73* (2017.01)
*G06T 7/246* (2017.01)
*G06K 9/00* (2006.01)

(52) U.S. Cl.
CPC .................. *G06T 7/70* (2017.01); *G06T 7/73* (2017.01); *G06T 2207/10016* (2013.01); *G06T 2207/30244* (2013.01); *G06T 2207/30252* (2013.01)

(56) References Cited

FOREIGN PATENT DOCUMENTS

| | | |
|---|---|---|
| CN | 105513083 A | 4/2016 |
| CN | 106446815 A | 2/2017 |
| WO | 2016099866 A1 | 6/2016 |

\* cited by examiner

METHOD FOR SIMULTANEOUS LOCALIZATION AND MAPPING

CROSS-REFERENCE TO RELATED APPLICATIONS

The present application is based on International Application No. PCT/CN2016/098990 filed on Sep. 14, 2016, the contents of which are incorporated herein by reference in its entirety.

TECHNICAL FIELD

The present disclosure relates to a monocular camera tracking method which can be applied to augmented reality, in particular to a robust camera tracking method based on a key frame.

BACKGROUND

In recent years, with the popularity of mobile terminals and wearable devices, augmented reality has gained unprecedented attention. Realistic augmented reality requires accurately estimating the camera orientation and reconstructing the scene in real time, which is also the problem to be solved by the simultaneous localization and mapping (SLAM) technology.

Due to the complexity of the real scene, the traditional SLAM method is not effective in practical applications. For example, when a new user uses a mobile device to shoot a scene and view an augmented reality effect, the user often moves and rotates the mobile device casually. Therefore, strong rotation and fast motion are very common. However, even the most advanced SLAM system can hardly handle such complex situations.

A good augmented reality experience requires that the SLAM system can handle a wide variety of complex camera motions while making it easy for the novices to get started. Moreover, it is necessary to ensure that the frequency lost in the camera is as little as possible under circumstances of rapid motion and severe motion blur. Even in the case of tracking failures, the camera should be relocalized quickly to avoid long waits.

Visual SLAM can be divided into two categories: filter-based methods and key frame-based methods. MonoSLAM (A. J. Davison, I. D. Reid, N. D. Molton, and O. Stasse. MonoSLAM: Real-time single camera SLAM. IEEE Transactions on Pattern Analysis and Machine Intelligence, 29 (6): 1052-1067, 2007) is a typical filter-based Method. The parameter of the camera motion and the scene three-dimensional point position are collectively represented as a high-dimensional probability state. An Extended Kalman Filter (EKF) is used to predict and update the state distribution of each frame. The biggest disadvantage of the MonoSLAM method is that the time complexity is O (N3) with N being the number of landmarks, so it is only suitable for a small scene of several hundreds of points. In addition, it is easy for the EKF to accumulate linearity errors. In order to overcome the above limitations, PTAM (G. Klein and D. W. Murray. Parallel tracking and mapping for small AR workspaces. In 6th IEEE/ACM International Symposium on Mixed and Augmented Reality, pages 225-234, 2007) adopts a novel parallel tracking and mapping framework based on key frames. In order to achieve real-time performance, the tracking is independent from the mapping. In order to ensure high precision, the background thread performs bundle adjustment (BA) on all key frames and the scene three-dimensional points. As summarized in (H. Strasdat, J. M. Montiel, and A. J. Davison. Visual SLAM: why filter? Image and Vision Computing, 30 (2):65-77, 2012), the method based on bundle adjustment of key frames is superior to the filter-based method, especially when the number N of landmarks is very large.

Recently, many of the most advanced SLAM systems have adopted key frame-based frameworks, such as RDSLAM (W. Tan, H. Liu, Z. Dong, G. Zhang, and H. Bao. Robust monocular SLAM in dynamic environments. In IEEE International Symposium on Mixed and Augmented Reality, pages 209 -218, 2013) and ORB-SLAM (R. Mur-Artal, J. Montiel, and J. D. Tardos. ORB-SLAM: a versatile and accurate monocular SLAM system. IEEE Transactions on Robotics, 31 (5):1147-1163, 2015). RDSLAM proposes a modified RANSAC method to achieve real-time localization in dynamic scenes by detecting the appearance and structural changes of the scene. ORB-SLAM adopts ORB features for camera localization, mapping, relocating, and loop detection. At the same time, the circulation loop is closed by pose graph optimization. Unlike most visual SLAM systems, LSD-SLAM (J. Engel, T. Sch"ops, and D. Cremers. LSD-SLAM: Large-scale direct monocular SLAM. In 13th European Conference on Computer Vision, Part II, pages 834-849. Springer, 2014) recovers the semi-dense depth map in real time to replace sparse features. Based on the semi-dense depth diagram, LSD-SLAM adopts direct tracking method to locate the camera orientation in real time, which is more robust in the scene without features. SVO (C. Forster, M. Pizzoli, and D. Scaramuzza. SVO: Fast semi-direct monocular visual odometry. In IEEE International Conference on Robotics and Automation, pages 15-22. IEEE, 2014) also adopts the direct tracking method, but with sparse feature points, and thus, high operating efficiency can be achieved.

A major drawback of the traditional key frame-based method is the lacking of robustness for strong rotation and fast motion. First, in order to fully constrain the three-dimensional points, it is required that there should be sufficient parallax between adjacent key frames, but this cannot be satisfied in the case of strong rotation. Secondly, feature matching between key frames with large baselines is time consuming so that the map extension delay is above several frames, and thus, it can only be operated in the background, which also easily leads to tracking loss under fast motion.

In order to improve the tracking robustness for large rotation, ORB-SLAM loosens the parallax requirement when the key frames are inserted. In order to ensure a sparse and accurate global map, redundant key frames and unstable three-dimensional points need to be eliminated later. Both LSD-SLAM and SVO propose to use filtering techniques to obtain robust depth estimation. Filter-based methods are somewhat robust for slow rotations because the parallax in such case is gradually growing larger. For pure rotation motion, similar tracking results can be obtained for any depth value. As the parallax increases slowly, the depth can be updated step by step and eventually converges to a good estimation value. But if the camera motions quickly, the processing difficulty will increase significantly. First of all, these methods are not able to solve the delay problem in map extension very well. If the stereo matching and depth filtering of the background thread cannot keep up with the fast motion of the camera, the tracking will fail. Secondly, strong rotation and fast motion make robust stereo matching very difficult. Since the search range and the distortion of the image block become unpredictable, the feature tracking based on template matching adopted by PTAM and SVO becomes unreliable. The invariant feature used by ORB-SLAM and RDSLAM describes that it is also sensitive to large perspective distortion and motion blur. ASIFT (J.-M. Morel and G. Yu. ASIFT: A new framework for fully affine invariant image comparison. SIAM Journal on Imaging Sciences, 2 (2):438-469, 2009) proposes to handle this problem by simulating different perspectives, but the huge computational cost does not apply to real-time applications.

Of course, there are now some SLAM methods that explicitly handle pure rotation problems. Gauglitz et al. (S. Gauglitz, C. Sweeney, J. Ventura, M. Turk, and T. Hollerer. Live tracking and mapping from both general and rotation-only camera motion. In IEEE International Symposium on Mixed and Augmented Reality, pages 13-22. IEEE, 2012) proposes to switch tracking at six degrees of freedom or panoramic tracking between the current frame and the most recent key frame to obtain a panoramic map and a plurality of scattered three-dimensional sub-maps. Pirchheim et al. (C. Pirchheim, D. Schmalstieg, and G. Reitmayr. Handling pure camera rotation in keyframe-based SLAM. In IEEE International Symposium on Mixed and Augmented Reality, pages 229-238, 2013) and Herrera et al. (C. Herrera, K. Kim, J. Kannala, K. Pulli, J. Heikkila, et al. DT-SLAM: Deferred triangulation for robust SLAM. In IEEE International Conference on 3D Vision, volume 1, pages 609-616, 2014) proposed a similar idea to get a global three-dimensional map. Pirchheim et al. set the depth of each two-dimensional feature point to infinity when performing tracking at six degrees of freedom. Herrera et al. proposed that for two-dimensional features, the re-projection error is replaced by the condition of minimizing the distance as much as possible. Both methods triangulate new three-dimensional points once sufficient parallax is detected. However, pure rotation rarely occurs in practice. It is difficult to avoid camera translation even when the user tries to rotate the camera around the optical center. Panoramic tracking will wrongly consider this translation as an additional rotational component, thereby causing drift. Secondly, the lack of three-dimensional constraints may easily lead to inconsistent scales. Moreover, none of these methods can handle the fast movement of the camera.

Recently, many SLAM systems have improved robustness by combining IMU data, which is referred as visual-inertial fusion SLAM (VI-SLAM). Most VI-SLAM methods are based on filtering. In order to break through the non-extensionality limitation of the filtering methods, MSCKF (A. I. Mourikis and S. I. Roumeliotis. A multi-state constraint kalman filter for vision-aided inertial navigation. In IEEE International Conference on Robotics and Automation, pages 3565-3572. IEEE, 2007) transformed the binary relationship constraint between the three-dimensional point and the camera into a multivariate constraint among multiple cameras. The state vector contains only camera motion and does not contain 3D point positions, thus achieving a linear computational complexity for the number of feature points. Li and Mourikis (M. Li and A. I. Mourikis. High-precision, consistent EKFbased visual-inertial odometry. The International Journal of Robotics Research, 32 (6):690-711, 2013) analyzed the system observability of MSCKF and proposed to fix the linearized points using the Jacobian matrix (G. P. Huang, A. I. Mourikis, and S. I. Roumeliotis. Analysis and improvement of the consistency of extended kalman filter based SLAM. In IEEE International Conference on Robotics and Automation, pages 473-479, 2008) obtained from the first estimation, so as to improve the system consistency of MSCKF. In (J. A. Hesch, D. G. Kottas, S. L. Bowman, and S. I. Roumeliotis. Consistency analysis and improvement of vision-aided inertial navigation. IEEE Transactions on Robotics, 30 (1): 158-176, 2014), the unobservable direction is explicitly specified, thus avoiding false information fusion and reducing system inconsistency. Furthermore, there are also some VI-SLAM methods based on nonlinear optimization, which express the problem as a factor graph and solve it with the Maximum A Posteriori (MAP) estimation. In order to achieve real-time optimization efficiency, only one local map can be maintained, such as (T.-C. Dong-Si and A. I. Mourikis. Motion tracking with fixed-lag smoothing: Algorithm and consistency analysis. In IEEE International Conference on Robotics and Automation, pages 5655-5662. IEEE, 2011) and (S. Leutenegger, S. Lynen, M. Bosse, R. Siegwart, and P. Furgale. Keyframe-based visual-inertial odometry using nonlinear optimization. The International Journal of Robotics Research, 34 (3):314-334, 2015), besides, it is also possible to use incremental optimization methods such as (M. Kaess, H. Johannsson, R. Roberts, V. Ila, J. J. Leonard, and F. Dellaert. iSAM2: Incremental smoothing and mapping using the bayes tree. International Journal of Robotics Research, 31 (2):216-235, 2012), (V. Indelman, S. Williams, M. Kaess, and F. Dellaert. Information fusion in navigation systems via factor graph based incremental smoothing. Robotics and Autonomous Systems, 61 (8):721-738, 2013) and (C. Forster, L. Carlone, F. Dellaert, and D. Scaramuzza. IMU preintegration on manifold for efficient visual-inertial maximum-a-posteriori estimation. In Robotics: Science and Systems, 2015). Most of these methods are aimed at robot navigation and have high quality requirements for IMU.

Under the assumption of smooth motion, Lovegrove et al. proposed to adopt cubic B-spline to parameterize the camera trajectory. With this representation, the camera orientation at any time and the corresponding first and second derivatives can be obtained by interpolation, so that the IMU measurement data can be easily integrated. The rolling shutter phenomenon can also be compensated well with the continuous-time representation. Kerl et al. (C. Kerl, J. Stuckler, and D. Cremers. Dense continuous-time tracking and mapping with rolling shutter RGB-D cameras. In IEEE International Conference on Computer Vision, pages 2264-2272, 2015) also adopted cubic B-spline and direct tracking method to track RGB-D cameras of rolling shutters, and create dense maps. However, strong rotation and fast motion violate the assumption of smooth motion. In addition, motion blur is usually much more obvious than the rolling shutter phenomenon during fast motion. Meilland et al. proposed a unified method to simultaneously estimate motion blur and rolling shutter deformation. But this method is for RGB-D cameras, and a three-dimensional model is required for monocular cameras.

SUMMARY

In view of the deficiencies in the related art, an object of the present disclosure is to provide a method for simultaneous localization and mapping, which reliably handles strong rotation and fast motion, thereby ensuring a good augmented reality experience.

The object of the present disclosure is achieved by the following technical solutions:

A method for simultaneous localization and mapping, includes steps of:
1) a foreground thread processing a video stream in real time, and extracting a feature point for any current frame $I_i$;

2) tracking a set of global homography matrices $H_i^G$;

3) using a global homography matrix and a specific plane homography matrix to track a three-dimensional point so as to obtain a set of 3D-2D correspondences required by a camera attitude estimation; and 4) evaluating quality of the tracking according to a number of the tracked feature points and classifying the quality into good, medium and poor;

4.1) when the quality of the tracking is good, performing extension and optimization of a local map, and then determining whether to select a new key frame;

4.2) when the quality of the tracking is medium, estimating a set of local homography matrices $H_{k \to i}^L$, and re-matching a feature that has failed to be tracked; and 4.3) when the quality of the tracking is poor, triggering a relocating program, and once the relocating is successful, performing a global homography matrix tracking using a key frame that is relocated, and then performing tracking of features again, wherein in step 4.1), when it is determined to select a new key frame, the selected new key frame wakes up a background thread for global optimization, the new key frame and a new triangulated three-dimensional point is added for extending a global map, and a local bundle adjustment is adopted for optimization; then an existing three-dimensional plane is extended, the added new three-dimensional point is given to the existing plane, or a new three-dimensional plane is extracted from the added new three-dimensional point; subsequently, a loop is detected by matching the new key frame with an existing key frame; and finally, a global bundle adjustment is performed on the global map.

In an embodiment, the step 2) includes:

for two adjacent frames of images, estimating a global homography transformation from a previous frame of image $I_{i-1}$ to a current frame of image $I_i$ by directly aligning the previous frame of image with the current frame of image as:

$$H_{(i-1) \to i}^G = \underset{H}{\operatorname{argmin}} \sum_{x \in \Omega} \left\| \tilde{I}_{i-1}(x) - \tilde{I}_i(\pi(\tilde{H} x^h)) \right\|_{\delta_1},$$

where $\tilde{I}_{i-1}$ and $\tilde{I}_i$ are small blurred images of $I_{i-1}$ and $I_i$ respectively, $\Omega$ is a small image domain, a superscript h indicates that a vector is a homogeneous coordinate, a tilde in $\tilde{H}$ indicates that a homography matrix H is converted from a source image space to a small image space, and $\|\cdot\|_\delta$ represents a Huber function; and a calculation method is expressed as the following formula:

$$\|e\|_\delta = \begin{cases} \dfrac{\|e\|_2^2}{2\delta} & \text{if } \|e\|_2 \le \delta \\ \|e\|_2 - \dfrac{\delta}{2} & \text{otherwise.} \end{cases} \quad (4)$$

for each key frame $F_k$, which has an initial solution to the global homography matrix $H_{k \to (i-1)}^G$ of $I_{i-1}$, using a set of feature matchings (denoted as $M_{k,i-1} = \{(X_k, X_{i-1})\}$) between frames $F_k$ and $I_{i-1}$ to determine a set of key frames which has an overlap with $I_{i-1}$ and is denoted as $K_{i-1}$, selecting five key frames satisfying that $|M_{k,i-1}| > 20$ and $|M_{k,i-1}|$ is maximized, optimizing an initial solution $H_{k \to (i-1)}^G$ for each key frame $F_k$ in $K_{i-1}$:

$$H_{k \to (i-1)}^G = \underset{H}{\operatorname{argmin}} \sum_{X \in \Omega} \left( \left\| \tilde{F}_k(x) - \tilde{I}_{i-1}(\pi(\tilde{H} x^h)) \right\|_{\delta_1} + \sum_{(x_k, x_{i-1}) \in M_{k,j-1}} \left\| \pi(\tilde{H} x_k^h) - x_{i-1} \right\|_{\delta_k} \right);$$

and obtaining the global homography transformation $H_{k \to t}^G = H_{(i-1) \to i}^G H_{k \to (i-1)}^G$ from the key frame $F_k$ to the current frame $I_i$ through transitivity.

In an embodiment, the step 3) includes:

for a feature point which is fully constrained and has a reliable three-dimensional position, determining a search position by predicting a camera orientation of a current frame $C_i$, predicting $C_i$ using the global homography matrix $H_i^G$, denoting a two-dimensional feature point of a frame $F_k \in K_{i-1}$ as $x_k$ and denoting a corresponding three-dimensional point as $X_k$, obtaining a three-dimensional to two-dimensional correspondence $(X_k, x_i)$ through a formula $x_i = \pi(H_{k \to i}^G x_k^h)$, in which a set of all the three-dimensional to two-dimensional correspondences is denoted as $V_{C_i} = \{(X_j, x_j)\}$, and predicting a camera position by solving $$\underset{C_i}{\operatorname{argmin}} \sum_{(X_j, x_j) \in V_{C_i}} \left\| \pi(K(R_i(X_j - p_i))) - x_j \right\|_{\delta_x}; \quad (6)$$

and for a feature point which is not fully constrained and has no reliable three-dimensional position, first of all, directly using $\pi(H_{k \to i}^G x_k^h)$ as the search position, and obtaining a set of local homography matrices $H_{k \to i}^L$ according to estimation of matched correspondence if the quality of the tracking is evaluated as medium, while for an unmatched feature, trying one by one in the search position $\{H_{k \to i}^{L_j} x_k | H_{k \to i}^{L_j} \in H_{k \to i}^L\}$, in which for each search position, its range is a r×r square area centered on the search position and r is 10 and 30 respectively for points fully constrained and points not fully constrained; and given a homography matrix $H_{k \to i}$, calculating a change of four vertices of each aligned image block, aligning a local block near $x_k$ in the key frame $F_k$ to the current frame $I_i$ through a formula $\kappa(y) = I_k(H_{k \to i}^{-1}(\pi(H_{k \to i} x_k^h + y^h)))$ (7) only when the change exceeds a certain threshold, wherein $\kappa(y)$ is an image gray scale for an offset of y relative to a center of the block, and $y \in (-W/2, W/2) \times (-W/2, W/2)$, where W is a dimension of the image block; and calculating a value of a zero-mean SSD for a FAST corner point extracted within a search area, and selecting one FAST corner which has the minimum zero-mean SSD when the offset is smaller than a certain threshold.

In an embodiment, said performing extension and optimization of the local map in step 4.1) includes:

for one two-dimensional feature $x_k$ of a frame $F_k$, calculating a ray angle according to a formula of $$\alpha(i,k) = \text{acos}\left(\frac{r_k^T r_i}{\|r_k\| \cdot \|r_i\|}\right) \tag{8}$$

once a corresponding feature $x_i$ is found in a frame $I_i$, where $r_j = R_j^T K^{-1} x_j^h$; if $\alpha(i,k) \geq \delta_\alpha$, obtaining a three-dimensional position X using a triangulation algorithm, and otherwise, specifying an average depth $d_k$ of the key frame $F_k$ for $x_k$ to initialize X, $X = d_k K^{-1} x_k^h$, and optimizing X according to a formula of $$\underset{X}{\text{argmin}} \|\pi(KR_k(X-p_k)) - x_k\|_2^2 + \|\pi(KR_i(X-p_i)) - x_i\|_2^2; \tag{9}$$

selecting a local window, fixing a camera orientation first, individually optimizing each three-dimensional point position $X_i$ by solving $$\underset{X_i}{\text{argmin}} \sum_{j \in V_{X_i}} \|\pi(K(R_j(X_i - p_j))) - x_{ij}\|_{\delta_x}, \tag{10}$$

where $V_{x_i}$ is a set of frame number indices of the key frame and a frame where the three-dimensional point $X_i$ is observed in a sliding window, and then fixing the three-dimensional point position and optimizing all camera orientations in the local window.

In an embodiment, said fixing the three-dimensional point position and optimizing all camera orientations in the local window includes:

assuming that there is already a linear acceleration â and a rotation speed $\hat{\omega}$ measured in a local coordinate system, and a real linear acceleration is $a = \hat{a} - b_a + n_a$, a real rotation speed is $\omega = \hat{\omega} - b_\omega + n_\omega$, $n_a \sim N(0, \sigma_{n_a}^2 I)$, $n_\omega \sim N(0, \sigma_{n_\omega}^2 I)$ are Gaussian noise of inertial measurement data, I is a 3×3 identity matrix, $b_a$ and $b_\omega$ are respectively offsets of the linear acceleration and the rotation speed with time, extending a state of a camera motion to be: $s = [q^T\ p^T\ v^T\ b_a^T\ b_\omega^T]^T$, where v is a linear velocity in a global coordinate system, a continuous-time motion equation of all states is:

$$\dot{q} = \frac{1}{2}\Omega(\omega)q,\ \dot{p} = v,\ \dot{v} = R^T a,\ \dot{b}_a = w_a,\ \dot{b}_\omega = w_\omega, \tag{15}$$

where $$\Omega(\omega) = \begin{bmatrix} -[\omega]_x & \omega \\ -\omega^T & 0 \end{bmatrix},$$

$[\bullet]_x$ represents a skew symmetric matrix, $w_a \sim N(0, \sigma_{w_a}^2 I)$ and $w_\omega \sim N(0, \sigma_{w_\omega}^2 I)$ represent random walk processes, and a discrete-time motion equation of a rotational component is:

$$q_{i+1} = q_\Delta(\omega_i, t_{\Delta_i}) \otimes q_i \tag{17},$$

where $$q_\Delta(\omega, t_\Delta) = \begin{cases} \begin{bmatrix} \frac{\omega}{|\omega|}\sin\left(\frac{|\omega|}{2}t_\Delta\right) \\ \cos\left(\frac{|\omega|}{2}t_\Delta\right) \end{bmatrix} & \text{if } |\omega| > \varepsilon_\omega \\ \begin{bmatrix} \frac{|\omega|}{2}t_\Delta \\ 1 \end{bmatrix} & \text{otherwise} \end{cases}, \tag{18}$$

$t_{\Delta_i}$ is a time interval between two adjacent key frames i and i+1, $\otimes$ is a quaternion multiplication operator, $\varepsilon_\omega$ is a small value that prevents zero division; and approximating a real value of $q_\Delta(\omega_i, t_{\Delta_i})$ by a formula of $$q_\Delta(\omega_i, t_{\Delta_i}) \approx \begin{bmatrix} \frac{\tilde{\theta}}{2} \\ 1 \end{bmatrix} \otimes q_\Delta(\hat{\omega}_i - b_{\omega_i}, t_{\Delta_i}), \tag{19}$$

where $\hat{\theta}$ is a 3×1 error vector, yielding: $\hat{\theta} \approx 2[q_{66}(\hat{\omega}_i - b_{\omega_i} + n_\omega, t_{66_i}) \otimes q_\Delta^{-1}(\hat{\omega}_i - b_{\omega_i}, t_{\Delta_i})]_{1.3} \approx 2G_\omega n_\omega$ (20), where $G_\omega$ is a Jacobian matrix associated with noise $n_\omega$, further yielding $\hat{\theta} \approx 2[q_{i+1} \otimes q_i^{-1} \otimes q_\Delta^{-1}(\hat{\omega}_i - b_{\omega_i}, t_{\Delta_i})]_{1.3}$ (21), and defining a cost function and a covariance of the rotational component as:

$$e_q(q_i, q_{i+1}, b_{\omega_i}) = [q_{i+1} \otimes q_i^{-1} \otimes q_\Delta^{-1}(\hat{\omega}_i - b_{\omega_i}, t_{\Delta_i})]_{1.3},$$
$$\Sigma_q = \sigma_{n_a}^2 G_\omega G_\omega^T \tag{22};$$

defining discrete-time motion equations, cost functions and covariance for other components as:

$$p_{i+1} = p_i + v_i t_{\Delta_i} + R_i^T p_\Delta(a_i, t_{\Delta_i}) \tag{25}$$

$$v_{i+1} = v_i + R_i^T v_\Delta(a_i, t_{\Delta_i})$$

$$b_{a_{i+1}} = b_{a_i} + w_a t_{\Delta_i}$$

$$b_{\omega_{i+1}} = b_{\omega_i} + w_\omega t_{\Delta_i}$$

$$e_p(q_i, p_i, p_{i+1}, v_i, b_{a_i}) = R_i(p_{i+1} - p_i - v_i t_{\Delta_i}) - p_\Delta(\hat{a}_i - b_{a_i}, t_{\Delta_i})$$

$$e_v(q_i, v_i, v_{i+1}, v_i, b_{a_i}) = R_i(v_{i+1} - v_i) - v_\Delta(\hat{a}_i - b_{a_i}, t_{\Delta_i})$$

$$e_{b_a}(b_{a_i}, b_{a_{i+1}}) = b_{a_{i+1}} - b_{a_i}$$

$$e_{b_\omega}(b_{\omega_i}, b_{\omega_{i+1}}) = b_{\omega_{i+1}} - b_{\omega_i}$$

$$\Sigma_p = \frac{1}{4}\sigma_{n_a}^2 t_{\Delta_i}^4 I$$

$$\Sigma_v = \sigma_{n_a}^2 t_{\Delta_i}^2 I$$

$$\Sigma_{b_a} = \sigma_{w_a}^2 t_{\Delta_i}^2 I$$

$$\Sigma_{b_\omega} = \sigma_{w_\omega}^2 t_{\Delta_i}^2 I,$$

where $$p_\Delta(a, t_\Delta) = \frac{1}{2}a t_\Delta^2,\ v_\Delta(a, t_\Delta) = a t_\Delta; \tag{24}$$

defining an energy function of all motion states $s_1 \ldots s_l$ in the sliding window as:

$$\underset{s_l \cdots s_l}{\text{argmin}} \sum_{i=1}^{l} \sum_{j \in V_{C_i}} \|\pi(K(R_i(X_j - p_i))) - x_{ij}\| + \tag{26}$$

-continued $$\sum_{i=1}^{l-1} \|e_q(q_i, q_{i+1}, b_{\omega_i})\|_{\Sigma_q}^2 + \sum_{i=1}^{l-1} \|e_p(q_i, p_i, p_{i+1}, v_i, b_{a_i})\|_{\Sigma_p}^2 +$$

$$\sum_{i=1}^{l-1} \|e_v(q_i, v_i, v_{i+1}, v_i, b_{a_i})\|_{\Sigma_v}^2 +$$

$$\sum_{i=1}^{l-1} \|e_{b_a}(b_{a_i}, b_{a_{i+1}})\|_{\Sigma_{b_a}}^2 + \sum_{i=1}^{l-1} \|e_{b_\omega}(b_{\omega_i}, b_{\omega_{i+1}})\|_{\Sigma_{b_\omega}}^2,$$

where l is a size of the sliding window and $\|e\|_\Sigma^2 = e^T \Sigma^{-1} e$ is a square of a Mahalanobis distance;

for a case without an IMU sensor, setting $\hat{a}_i = 0$, obtaining one optimal angular velocity by using the feature matching to align successive frame images:

$$\hat{\omega}_i = \underset{\omega}{\operatorname{argmin}}\left(\sum_{x \in \Omega} \|\tilde{I}_i(x) - \tilde{I}_{i+1}(\pi(KR_\Delta(\omega, t_{\Delta_i})K^{-1}x^h))\|_{\delta_I} + \right.$$
$$\left. \sum_{(x_i, x_{i+1}) \in M_{i,i+1}} \frac{1}{\delta_X} \|\pi(KR_\Delta(\omega, t_{\Delta_i})K^{-1}x_i^h) - x_{i+1}\|_2^2 \right),$$

(27)

where $R_\Delta(\omega, t_\Delta)$ is a rotation matrix of the formula (18), $M_{i,i+1}$ is a set of feature matchings between images i and i+1, denoting a set of IMU measurement data between frames i and i+1 as $\{(\hat{a}_{ij}, \hat{\omega}_{ij}, t_{ij}) | j=1 \ldots n_i\}$ if there is real IMU measurement data, where $\hat{a}_{ij}$, $\hat{\omega}_{ij}$ and $t_{ij}$ are respectively a $j_{th}$ linear acceleration, a rotation speed and a timestamp; and using a pre-integration technique to pre-integrate the IMU measurement data, and using the following formulas to replace components in (18) and (24):

$$q_\Delta(\{(\hat{\omega}_{ij} - b_{\omega_i}, t_{ij})\}) \approx q_\Delta(\hat{\omega}_{ij} - \hat{b}_{\omega_i}, t_{ij}) + \frac{\partial q_\Delta}{\partial b_\omega}(b_\omega - \hat{b}_\omega)$$

$$p_\Delta(\{(\hat{a}_{ij} - b_{a_i}, \hat{\omega}_{ij} - b_{\omega_i}, t_{ij})\}) \approx$$
$$p_\Delta(\{(\hat{a}_{ij} - \hat{b}_{a_i}, \hat{\omega}_{ij} - \hat{b}_{\omega_i}, t_{ij})\}) + \frac{\partial p_\Delta}{\partial b_a}(b_a - \hat{b}_a) + \frac{\partial p_\Delta}{\partial b_\omega}(b_\omega - \hat{b}_\omega),$$

$$v_\Delta(\{(\hat{a}_{ij} - b_{a_i}, \hat{\omega}_{ij} - b_{\omega_i}, t_{ij})\}) \approx$$
$$v_\Delta(\{(\hat{a}_{ij} - \hat{b}_{a_i}, \hat{\omega}_{ij} - \hat{b}_{\omega_i}, t_{ij})\}) + \frac{\partial v_\Delta}{\partial b_a}(b_a - \hat{b}_a) + \frac{\partial v_\Delta}{\partial b_\omega}(b_\omega - \hat{b}_\omega)$$

where $\hat{b}_{a_i}$ and $\hat{b}_{\omega_i}$ are states of $b_{a_i}$ and $b_{\omega_i}$ when being pre-integrated.

In an embodiment, the global optimization by the background thread includes:

for each three-dimensional point in the new key frame $F_k$, calculating a maximum ray angle with respect to the existing key frame using the formula (8) first; marking the point as a fully constrained three-dimensional point if $\max_i \alpha(i,k) \geq \delta_\alpha$ and three-dimensional coordinates are successfully triangulated; then extending the existing three-dimensional plane visible in the frame $F_k$ by the new and fully constrained three-dimensional point X belonging to the plane; defining a neighborhood relationship by performing Delaunay triangulation on the two-dimensional feature in the key frame $F_k$; when a three-dimensional point satisfies the following three conditions at the same time, adding this point to a set $V_P$ of the plane P: 1) X is not assigned to any plane, 2) X is connected with another point in $V_P$, and 3) $|n^T X + d| < \delta_P$, where $d_k$ is the average depth of the key frame $F_k$; adopting a RANSAC algorithm to extract a new three-dimensional plane; randomly sampling three connected points in each iteration to initialize a set $V_P$ of three-dimensional interior points; adopting SVD to recover a three-dimensional plane parameter P, and then starting an inner loop which iteratively adjusts extension and optimization of the plane; for each internal iteration, checking a distance from the three-dimensional points X, which are connected to the points in the set $V_P$, to the plane; if $|n^T X + d| < \delta_P$, adding X to $V_P$, optimizing the plane by a minimization formula for all points in $V_P$:

$$\underset{P}{\operatorname{argmin}} \sum_{X \in V_P} (n^T X + d)^2,$$

(28)

and iteratively extending $V_P$ by repeating the above steps; and when $|V_P| < 30$, discarding P and $V_P$; sorting the extracted planes in a descending order according to a number of relevant three-dimensional points, and denoting a set of the sorted interior points as $\{V_{P_i} | i=1 \ldots N_P\}$; starting from a first one, for any $V_{P_i}$, if a three-dimensional point $X \in V_{P_i}$ also exists in a previous set of plane points $V_{P_j}(j<i)$, removing this point from $V_{P_i}$; and optimizing the three-dimensional plane parameter by adding a point-to-plane constraint in the global bundle adjustment, $$\underset{C,X,P}{\operatorname{argmin}} \sum_{i=1}^{N_F} \sum_{j \in V_i} \|\pi(K(R_i(X_j - p_i))) - x_{ij}\|_{\delta_x} + \sum_{i=1}^{N_P} \sum_{j \in V_{P_i}} \|n_i^T X_j + d_j\|_{\delta_P}.$$

(29)

In an embodiment, the method for simultaneous localization and mapping further includes an initialization step of placing a virtual object on a specific plane of a real scene in a real size:

initializing the tracking using a planar marker of a known size, providing a world coordinate system at a center of the planar marker, adopting n three-dimensional points $X_i$, $i=1, \ldots, n$ uniformly along an edge of the planar marker, and recovering an orientation (R,t) of a camera in an initial frame by solving the following optimization equation:

$$\underset{R,t}{\operatorname{argmin}} \sum_{i=1}^{n} \|I(\pi(RX_i + t)) - I(\pi(R(X + \delta X_i^{\|}) + t))\|^2 +$$
$$\|I(\pi(RX_i + t)) - I(\pi(R(X + \delta X_i^{\perp}) + t)) + 255\|^2,$$

(30)

where directions of $\delta X_\|$ and $\delta X_\perp$ are respectively a direction along a tangent at $X_i$ of the edge and a vertically inward direction at $X_i$, and lengths thereof ensure that distances between projection points of $X + \delta X_i^{\|}$ and $X + \delta X_i^{\perp}$ on the image and a projection point of $X_i$ are one pixel; constructing a 4-layer pyramid for the image by adopting a coarse-to-fine strategy to enlarge a convergence range, starting from a top layer, and using an optimized result as an initial value of a lower layer optimization.

The beneficial effects of the present disclosure are:

1. The method of the present disclosure provides a new simultaneous localization and mapping framework, which advances the extension and optimization of partial local map to the foreground thread, thereby improving the robustness against strong rotation and fast motion.

2. The method of the present disclosure provides a method for feature tracking based on multiple homography matrices, which can be used for tracking a three-dimensional feature point that is fully constrained and sufficient to recover the three-dimensional position accurately, and can also be used for feature-tracking a point that is not fully constrained and has unreliable three-dimensional position. This method not only can handle strong rotation and fast motion, but also can achieve real-time computational efficiency, and can further run in real time on mobile devices.

3. The method of the present disclosure provides a new local map optimization method based on a sliding window, which can effectively optimize the camera orientation by reasonably simulating the IMU measurement value, and significantly improve the robustness in the case of rapid camera motion and severe blurring. This optimized framework can also be extended to the case where actual IMU data is incorporated, so as to further improve robustness and accuracy.

4. The method of the present disclosure provides a method of obtaining a real scale of a particular plane and scene, thereby placing a virtual object on a particular plane in a real size. This method only requires the user to align the size of a known marker to initiate tracking without the need to capture the marker texture in advance, so it is more convenient to use.

BRIEF DESCRIPTION OF DRAWINGS

FIG. 1 is a system framework diagram of the method RKSLAM herein. It's important to note that unlike most key frame-based systems that put all the mapping work in the background, the present method puts the local map extension and optimization in the foreground in order to handle strong rotation and fast motion.

FIG. 2 is a comparison diagram of the global homography matrix estimation. (a) Current image. (b) Selected key frame that needs matching. (c) Align (b) to (a) by solving formula (3). (d) Align (b) to (a) by solving formula (5). (e) A combination of (a) and (c). (f) A combination of (a) and (d).

FIG. 5 is a diagram that compares the effect of the SLAM method in an indoor scene in the way of inserting a virtual cube. (a) RKSLAM result without a priori motion constraint. (b) RKSLAM result when setting $\hat{a}_i=0$ and $\hat{\omega}_i=0$. (c) RKSLAM result with estimated rotation speed. (d) RKSLAM result when actual IMU data is incorporated. (e) Result of ORB-SLAM. (f) Result of PTAM. (g) Result of LSD-SLAM.

DESCRIPTION OF EMBODIMENTS

The present disclosure discloses a method for simultaneous localization and mapping, which can reliably handle strong rotation and fast motion, thereby ensuring a good experience of augmented reality. In this method, a new feature tracking method based on multiple homography matrix is proposed, which is efficient and robust under strong rotation and fast motion. Based on this, a real-time local map extension strategy is further proposed, which can triangulate three-dimensional points of a scene in real time. Moreover, a camera orientation optimization framework based on a sliding window is also proposed to increase priori motion constraints between successive frames using simulated or actual IMU data.

Before describing the present method in detail, the convention of the mathematical formula in the method is introduced (same as R. Hartley and A. Zisserman. Multiple view geometry in computer vision. Cambridge university press, 2004). A scalar is represented by an italic character (such as x), and a matrix is represented by a bold uppercase letter (such as H); a column vector is represented by a bold letter (such as b), and a transpose $b^\perp$ thereof represents a corresponding row vector. In addition, a set of points, vectors, and matrices is generally represented by an italic uppercase letter (such as V). For the vector x, the superscript h represents the corresponding homogeneous coordinate, such as $X^h$. In the method, each three-dimensional point i contains a three-dimensional position $X_i$ and a local image block $X_i$. Each frame i holds its image $I_i$, camera orientation $C_i$, a set of two-dimensional feature point positions $\{x_{ij}\}$, and a set of corresponding three-dimensional point indices $V_i$. A set of selected key frames is represented by $\{F_k|k=1 \ldots N_F\}$. The camera orientation is parameterized as a quaternion $q_i$ and a camera position $p_i$. For a three-dimensional point $X_j$, its two-dimensional projection in the $i_{th}$ image is calculated by the following formula: $x_{ij}=\pi(K(R_i(X_j-p_i)))$ (1), where K is the camera internal parameter which is known and constant by default, and $R_i$ is a rotation matrix of $q_i$, while $\pi(\bullet)$ is a projection function $\pi([x,y,z]^T)=[x/z,y/z]^T$. Each plane i holds its parameter $P_i$ and an index of a three-dimensional point belonging to it, which is marked as $V_{P_i}$. The plane parameter is defined as $P_i=[n_i^T, d_i]^T$, where $n_i$ represents a normal direction thereof and $d_i$ represents a symbol distance from an origin to the plane. For the three-dimensional point X on the plane, the formula $n_i^T X+d_i=0$ is satisfied. The system maintains three types of homography matrices, which are used to describe a transformation from the key frame to the current frame. These three types of homography matrices are respectively: a global homography matrix, a local homography matrix and a specific plane homography matrix. The global homography matrix is used for its entire image. The global homography matrix from the key frame $F_k$ to the current frame $I_i$ is expressed as $H_{k \to i}^G$, and a set of global homography matrices of all key frames is expressed as $H_i^G=\{H_{k \to i}^G|k=1 \ldots N_F\}$. The local homography matrix is used to align two local image blocks. For two frames $(F_k, I_i)$, multiple local homography matrices can be obtained and expressed as $H_{k \to i}^L=\{H_{k \to i}^{L_j}|j=1 \ldots N_{k \to i}^L\}$. The specific plane homography matrix is also used to align an image area of a specific three-dimensional plane. For the three-dimensional plane $P_j$ existing in the key frame $F_k$, its corresponding homography matrix from $F_k$ to $I_i$ can be written as $$H_{k \to i}^{P_j} = K\left(R_i R_k^T + \frac{R_i(p_i - p_k)n_j^T R_k^T}{d_j + n_j^T R_k p_k}\right)K^{-1}. \qquad (2)$$

For each key frame $F_k$, a set of specific plane homography matrices is solved and expressed as $H_{k \to i}^P=\{H_{k \to i}^{P_j}|j=1 \ldots N_{k \to i}^P\}$.

For a set of continuously dynamically changing video sequences (FIG. 5), the camera parameters are estimated using the method proposed by the present disclosure, and the camera has strong rotation and fast motion when shooting.

Figure 1:
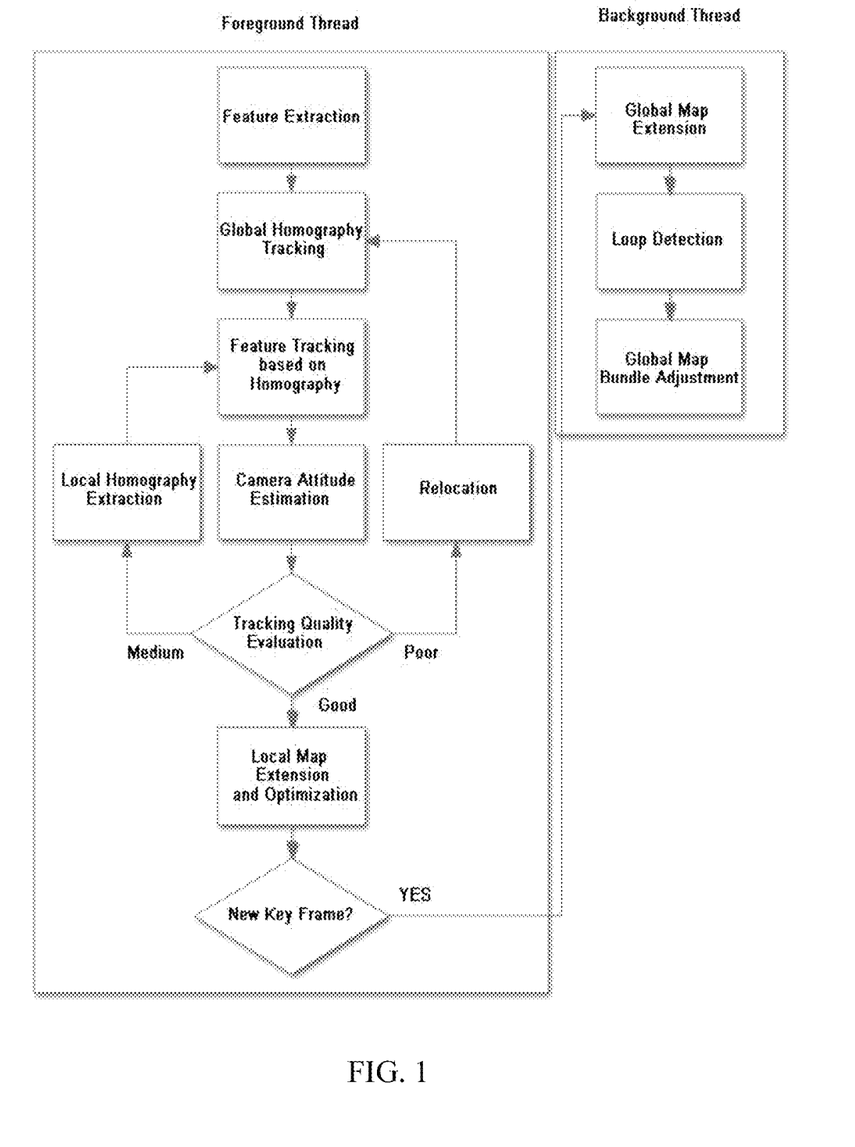

As shown in FIG. 1, the implementation steps are as follows:

1. The foreground thread processes a video stream in real time. For any current frame $I_i$ a FAST corner point is extracted first (E. Rosten and T. Drummond. Machine learning for high speed corner detection. In 9th European Conference on Computer Vision, Part I, pages 430-443. Springer, 2006), and a set of global homography matrices $H_i^G$ of $I_i$ is tracked and obtained.

The global homography matrix can roughly align the entire image, and the global homography matrix is estimated by directly aligning the key frame $F_k$ and the current frame $I_i$:

$$H_{k \to i}^G = \operatorname*{argmin}_H \sum_{X \in \Omega} \left\| \tilde{F}_k(x) - \tilde{I}_i(\pi(\tilde{H}x^h)) \right\|_{\delta_I}. \tag{3}$$

$\tilde{F}_k$ and $\tilde{I}_i$ are respectively small blurred images (SBI) of $F_k$ and $I_i$ (G. Klein and D. W. Murray. Improving the agility of keyframe-based SLAM. In 10th European Conference on Computer Vision, Part II, pages 802-815. Springer, 2008). $\Omega$ is a SBI domain, and a superscript h indicates that the vector is a homogeneous coordinate. A tilde in $\tilde{H}$ indicates that the homography matrix H is converted from a source image space to a SBI space. $\delta_I$, $\|\bullet\|_\delta$ represents a Huber function, and a calculation method is as follows:

$$\|e\|_\delta = \begin{cases} \dfrac{\|e\|_2^2}{2\delta} & \text{if } \|e\|_2 \leq \delta \\ \|e\|_2 - \dfrac{\delta}{2} & \text{otherwise}. \end{cases} \tag{4}$$

Assuming that a baseline between two adjacent frames is small, a global homography matrix can roughly represent a motion between two frames of images. By solving the formula (3) for the previous frame $I_{i-1}$ and the current frame $I_i$, $H_{(i-1) \to i}^G$ can be obtained. $H_{k \to i}^G = H_{(i-1) \to i}^G H_{k \to (i-1)}^G$ can be obtained by transitivity. The set of feature matchings (denoted as $M_{k,i-1} = \{(x_k, x_{i-1})\}$) between $F_k$ and $I_{i-1}$ is used, $H_{\to (i-1)}^G$. First, a set of key frames which has an overlapping area with $I_{i-1}$ is determined using $M_{k,i-1}$ and denoted as $K_{i-1}$. Five key frames are selected under conditions that $|M_{k,i-1}| > 20$ and $|M_{k,i-1}|$ is maximized. For each key frame $F_k$ in $K_{i-1}$, $M_{k,i-1}$ is used to prevent cumulative errors and offsets, and the formula (3) is modified to:

$$H_{k \to (i-1)}^G = \operatorname*{argmin}_H \sum_{X \in \Omega} \Biggl( \left\| \tilde{F}_k(x) - \tilde{I}_{i-1}(\pi(\tilde{H}x^h)) \right\|_{\delta_I} + \sum_{(x_k, x_{i-1}) \in M_{k,i-1}} \left\| \pi(\tilde{H}x_k^h) - x_{i-1} \right\|_{\delta_x} \Biggr), \tag{5}$$

Figure 2A:
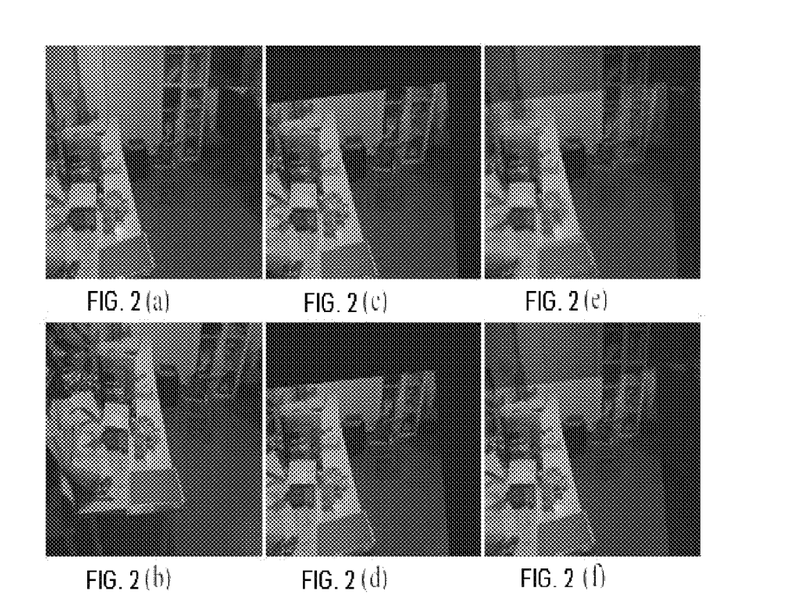

$\delta_x$. In the experiment, $\delta_I = 0.1$, $\delta_x = 10$. With respect to formula (3), formula (5) can interpolate multiple plane motions in case of a larger baseline. The Gauss-Newton method is used to solve formulas (3) and (5). FIG. 2 is a comparison diagram in which (a) is the current image and (b) is the selected key frame. As shown in the figure, if formula (3) is directly solved, it can be seen from (c) and (e) that an estimation result of the global homography matrix is not good, and the alignment error is very obvious; and on the contrary, the estimation effect of the global homography matrix obtained by the formula (5) is much better, as shown in (d) and (f).

2. The global homography matrix and the specific plane homography matrix are used to track the three-dimensional point, and obtain a set of 3D-2D correspondences required by the camera orientation estimation.

For a point which is fully constrained and has a reliable three-dimensional position, it is only necessary to predict the camera orientation of the current frame $C_i$ to project a three-dimensional point and determine the search position. $C_i$ is predicted using a global homography matrix $H_i^G$. The global homography matrix can be derived from the previous frame $I_{i-1}$, and the set of key frames overlapping with it is In order not to lose generality, any two-dimensional feature of the frame $F_k \in K_{i-1}$ is denoted as $x_k$ and the corresponding three-dimensional point is denoted as $X_k$. Through the formula $x_i = \pi(H_{k \to i}^G x_k^h)$, a three-dimensional to two-dimensional correspondence $(X_k, xi)$ can be obtained. A set of all three-dimensional to two-dimensional correspondences is denoted as $V_{c_i} = \{(X_j, x_j)\}$. The camera position can be predicted by a formula of $$\operatorname*{argmin}_{C_i} \sum_{(X_j, x_j) \in V_{C_i}} \left\| \pi(K(R_i(X_j - p_i))) - x_j \right\|_{\delta_x} \tag{6}$$

$R_i$. If there is real IMU data, the camera position can also be predicted directly by propagation of the IMU state.

For a point belonging to the three-dimensional plane $P_j$, the plane homography matrix $H_{k \to i}^{P_j}$ obtained by formula (2) is used for image block alignment, and used to estimate the camera orientation.

3. The method in the paper (G. Klein and D. W. Murray. Parallel tracking and mapping for small AR workspaces. In 6th IEEE/ACM International Symposium on Mixed and Augmented Reality, pages 225-234, 2007) is used to evaluate quality of the tracking which can be divided into good, medium (not good) and poor (the tracking result may be not good or even poor for fast motion with large translation).

3.1. When the quality of the tracking is good, the tracking result is used directly to extend and optimize the local map, and then corresponding algorithms in papers (G. Klein and D. W. Murray. Parallel tracking and mapping for small AR workspaces. In 6th IEEE/ACM International Symposium on Mixed and Augmented Reality, pages 225-234, 2007) and (G. Klein and D. W. Murray. Improving the agility of key frame-based SLAM. In 10th European Conference on Computer Vision, Part II, pages 802-815. Springer, 2008) are used to determine whether a new key frame is to be selected or not.

For a two-dimensional feature $x_k$ of the frame $F_k$, once a corresponding feature $x_i$ is found in frame $I_i$, the three-dimensional point X will be triangulated. Firstly, the ray angle is calculated according to the formula $$\alpha(i, k) = \operatorname{acos}\left( \frac{r_k^T r_i}{\|r_k\| \cdot \|r_i\|} \right), \tag{8}$$

where $r_j = R_j^T K^{-1} x_j^h$. In the ideal case where there is sufficient parallax and $\alpha(i, k) \geq \delta_\alpha$, the conventional triangulation algorithm in (R. Hartley and A. Zisserman. Multiple view geometry in computer vision. Cambridge university press, 2004) is used to obtain X. In the experiment, it is set that $\delta_\alpha = 1°$. However, in most cases, the parallax in the first observation is often insufficient. But on the other hand, the depth of any $x_k$ will result in similar re-projection results in frame $I_i$, so that in this step an arbitrary depth can be specified for $x_k$. In the method, the average depth $d_k$ of the key frame $F_k$ is used to initialize X, that is $X=d_k K^{-1} x_k^h$, and X is optimized according to a formula of $$\underset{X}{\operatorname{argmin}} \|\pi(KR_k(X-p_k))-x_k\|_2^2 + \|\pi(KR_i(X-p_i))-x_i\|_2^2. \qquad (9)$$

Once there is enough motion parallax, the depth error may affect camera tracking. It is best to perform bundle adjustment to the local map at the time when each new frame arrives, but this cannot achieve real-time performance. It is therefore possible to modify the optimization process so as to optimize only the three-dimensional point or the camera orientation at a time, and these two steps are carried out in turn. This strategy is very effective in practical applications, and can significantly reduce the computing load to achieve real-time, even in mobile devices.

Optimizing the three-dimensional point under the premise of a fixed camera orientation is relatively simple. Each three-dimensional point $X_i$ can be individually optimized by the minimization formula $$\underset{X_i}{\operatorname{argmin}} \sum_{j \in V_{X_i}} \|\pi(K(R_j(X_i-p_j)))-x_{ij}\|_{\delta_x}, \qquad (10)$$

where $V_{x_i}$ is a set of frame number indices of the key frame and a frame where the three-dimensional point $X_i$ is observed in a sliding window.

The orientation of each camera i is optimized separately using equation $$\underset{C_i}{\operatorname{argmin}} \sum_{j \in V_i} \|\pi(K(R_i(X_j-p_i)))-x_{ij}\|_{\delta_x}, \qquad (11)$$

where $V_i$ is a set of point indices of three-dimensional points visible in the frame i. However, any feature tracking method may fail due to the severe blur caused by fast camera motion. These blurred frames lack the constraints of reliable camera orientation estimation. In view of that the fast camera motion typically only occurs occasionally and does not last long, adjacent frames can be used to constrain the blurred frames. Specifically, we draw on the idea of VI-SLAM, such as (A. I. Mourikis and S. I. Roumeliotis. A multi-state constraint kalman filter for vision-aided inertial navigation. In IEEE International Conference on Robotics and Automation, pages 3565-3572. IEEE, 2007), (J. A. Hesch, D. G. Kottas, S. L. Bowman, and S. I. Roumeliotis. Consistency analysis and improvement of vision-aided inertial navigation. IEEE Transactions on Robotics, 30 (1): 158-176, 2014) and (S. Leutenegger, S. Lynen, M. Bosse, R. Siegwart, and P. Furgale. Keyframe-based visual-inertial odometry using nonlinear optimization. The International Journal of Robotics Research, 34 (3):314-334, 2015). Assume that there is already IMU measurement data in the local coordinate system (including a linear acceleration â and a rotation speed $\hat{\omega}$) and a camera attitude is the same as that of the IMU, the state of the camera motion can be extended to $s=[q^T p^T v^T b_a^T b_\omega^T]^T$, where v is the linear velocity in the global coordinate system, and $b_a$ and $b_\omega$ are respectively offsets of the linear acceleration and the rotation speed with time. The real linear acceleration is $a=\hat{a}-b_a+n_a$(13) and the rotation speed is $\omega=\hat{\omega}-b_\omega+n_\omega$(14), where $n_a \sim N(0, \sigma_{n_a}^2 I)$, $n_\omega \sim N(0, \sigma_{n_a}^2 I)$ is the Gaussian noise of the inertial measurement data, and I is a 3×3 identity matrix. In the experiment, it is generally set that $\sigma_{n_a}=0.01$ m/(s²√Hz), $\sigma_{n_a}=0.01$ rad/(s√Hz) (if the actual IMU measurement data is provided, setting $\sigma_{n_a}=0.001$ rad/(s√Hz). The continuous-time motion model (A. B. Chatfield. Fundamentals of high accuracy inertial navigation. AIAA, 1997) describes the time evolution of states:

$$\dot{q} = \frac{1}{2}\Omega(\omega)q, \quad \dot{p} = v, \quad \dot{v} = R^T a, \quad \dot{b}_a = w_a, \quad \dot{b}_\omega = w_\omega, \qquad (15)$$

where $$\Omega(\omega) = \begin{bmatrix} -[\omega]_\times & \omega \\ -\omega^T & 0 \end{bmatrix}$$

and $[\bullet]_\times$ represents a skew symmetric matrix. $\dot{b}_a$ and $\dot{b}_\omega$ are respectively random walk processes represented by the Gaussian white noise model $w_a \sim N(0, \sigma_{w_a}^2 I)$ and $w_\omega \sim N(0, \sigma_{w_a}^2 I)$. In the experiment, it is set that $\sigma_{w_a}=0.001$ m/(s³√Hz), $\sigma_{w_a}=0.000$ rad/(s²√Hz). For the discrete-time state, an integration method proposed by (N. Trawny and S. I. Roumeliotis. Indirect kalman filter for 3D attitude estimation. Technical Report 2005-002, University of Minnesota, Dept. of Comp. Sci. & Eng., March 2005) is used to transmit the quaternion:

$$q_{i+1} = q_\Delta(\omega_i, t_{\Delta_i}) \otimes q_i, \text{ where} \qquad (17)$$

$$q_\Delta(\omega, t_\Delta) = \begin{cases} \begin{bmatrix} \frac{\omega}{|\omega|}\sin\left(\frac{|\omega|}{2}t_\Delta\right) \\ \cos\left(\frac{|\omega|}{2}t_\Delta\right) \end{bmatrix} & \text{if } |\omega| > \varepsilon_\omega \\ \begin{bmatrix} \frac{|\omega|}{2}t_\Delta \\ 1 \end{bmatrix} & \text{otherwise} \end{cases}, \qquad (18)$$

where $t_{\Delta_i}$ is a time interval between two adjacent key frames i and i+1, $\otimes$ is a quaternion multiplication operator, and $\varepsilon_\omega$ a small value that prevents zero division. In the experiment, it is set that $\varepsilon_\omega=0.00001$ rad/s. The real value of $q_\Delta(\omega_i, t_{\Delta_i})$ is approximated by the formula $$q_\Delta(\omega_i, t_{\Delta_i}) \approx \begin{bmatrix} \frac{\tilde{\theta}}{2} \\ 1 \end{bmatrix} \otimes q_\Delta(\hat{\omega}_i - b_{\omega_i}, t_{\Delta_i}), \qquad (19)$$

where $\tilde{\theta}$ is a 3×1 error vector. By substituting formula (14) into formula (19), it can be obtained that:

$$\tilde{\theta} \approx 2[q_\Delta(\hat{\omega}_i - b_{\omega_i} + n_{107}, t_{\Delta_i}) \otimes q_\Delta^{-1} \\ (\hat{\omega}_i - b_{\omega_i} t_{\Delta_i})]_{1:3} \approx 2G_\omega n_\omega \qquad (20),$$

where $G_\omega$ is a Jacobian matrix associated with noise By substituting the formula (19) into the formula (17), it can be obtained that:

$$\tilde{\theta} \approx 2[q_{i+1} \otimes q_i^{-1} \otimes q_\Delta^{-1}(\hat{\omega}_i - b_{\omega_i} t_{\Delta_i})]_{1:3} \qquad (21).$$

Combining (20) and (21), the cost function and covariance of the rotation component are respectively defined as:

$$e_q(q_i, q_{i+1}, b_{\omega_i}) = [q_{i+1} \otimes q_i^{-1} \otimes q_\Delta^{-1}(\hat{\omega}_i - b_{\omega_i}, t_{\Delta_i})]_{1:3},$$
$$\Sigma_q = \sigma_{n_\omega}^2 G_\omega G_\omega^T \qquad (22).$$

The derivation for other components is relatively simple. The transitivity formulas of the discrete-time states are as follows:

$$p_{i+1} = p_i + v_i t_{66_i} + R_i^T p_\Delta(a_i, t_{\Delta_i})$$

$$v_{i+1} = v_i + R_i^T v_\Delta(a_i, t_{\Delta_i})$$

$$b_{a_{i+1}} = b_{a_i} + w_a t_{\Delta_t}$$

$$b_{\omega_{i+1}} = b_{\omega_i} + w_\omega t_{\Delta_t} \qquad (23)$$

where $$p_\Delta(a, t_\Delta) = \frac{1}{2} a t_\Delta^2, \ v_\Delta(a, t_\Delta) = a t_\Delta. \qquad (24)$$

The error function and the corresponding covariance are:

$$e_p(q_i, p_i, p_{i+1}, v_i, b_{a_i}) = R_i(p_{i+1} - p_i - v_i t_{\Delta_i}) - p_\Delta(\hat{a}_i - b_{a_i}, t_{\Delta_i}) \qquad (25)$$

$$e_v(q_i, v_i, v_{i+1}, v_i, b_{a_i}) = R_i(v_{i+1} - v_i) - v_\Delta(\hat{a}_i - b_{a_i}, t_{\Delta_i})$$

$$e_{b_a}(b_{a_i}, b_{a_{i+1}}) = b_{a_{i+1}} - b_{a_i}$$

$$e_{b_\omega}(b_{\omega_i}, b_{\omega_{i+1}}) = b_{\omega_{i+1}} - b_{\omega_i}$$

$$\Sigma_p = \frac{1}{4} \sigma_{n_a}^2 t_{\Delta_i}^4 I$$

$$\Sigma_v = \sigma_{n_a}^2 t_{\Delta_i}^2 I$$

$$\Sigma_{b_a} = \sigma_{w_a}^2 t_{\Delta_i}^2 I$$

$$\Sigma_{b_\omega} = \sigma_{w_\omega}^2 t_{\Delta_i}^2 I.$$

Based on these correlation constraints between adjacent frames defined by (22) and (25), the energy function of all motion states $s_1 \ldots s_l$ in the sliding window can be defined as:

$$\operatorname*{argmin}_{s_1 \ldots s_l} \sum_{i=1}^{l} \sum_{j \in V_{C_i}} \|\pi(K(R_i(X - p_i))) - x_{ij}\| + \sum_{i=1}^{l-1} \|e_q(q_i, q_{i+1}, b_{\omega_i})\|_{\Sigma_q}^2 + \qquad (26)$$

$$\sum_{i=1}^{l-1} \|e_p(q_i, p_i, p_{i+1}, v_i, b_{a_i})\|_{\Sigma_p}^2 + \sum_{i=1}^{l-1} \|e_v(q_i, v_i, v_{i+1}, v_i, b_{a_i})\|_{\Sigma_v}^2 +$$

$$\sum_{i=1}^{l-1} \|e_{b_a}(b_{a_i}, b_{a_{i+1}})\|_{\Sigma_{b_a}}^2 + \sum_{i=1}^{l-1} \|e_{b_\omega}(b_{\omega_i}, b_{\omega_{i+1}})\|_{\Sigma_{b_\omega}}^2,$$

where l is a size of the sliding window and $\|e\|_\Sigma^2 = e^T \Sigma^{-1} e$ is a square of a Mahalanobis distance.

The above derivatives assume that inertial measurement data $\hat{a}_i$ and $\hat{\omega}_i$ are known, but actually there may be no IMU sensor. For the linear acceleration, it can be set to be $\hat{a}_i = 0$, because there is almost no sudden jump in the AR application. However, for the rotation speed, since the user often needs to turn his or her head to view the entire AR effect, it cannot be set to be $\hat{\omega}_i = 0$. Therefore, feature matching is used to align the continuous SBI to obtain a best fitting:

$$\hat{\omega}_i = \operatorname*{argmin}_{\omega} \left( \sum_{x \in \Omega} \|\tilde{I}_i(x) - \tilde{I}_{i+1}(\pi(KR_\Delta(\omega, t_{\Delta_i}) K^{-1} x^h))\|_{\delta_I} + \right. \qquad (27)$$

$$\left. \sum_{(x_i, x_{i+1}) \in M_{i,j+1}} \frac{1}{\delta_X} \|\pi(KR_\Delta(\omega, t_{\Delta_i}) K^{-1} x_i^h) - x_{i+1}\|_2^2 \right),$$

where $R_\Delta(\omega, t_\Delta)$ is a rotation matrix of formula (18), and $M_{i,i+1}$ is a set of feature matchings between images i and i+1. $\delta_X$ controls a weight of a feature matching item and is set to be 10 in the experiment. The Gauss Newton algorithm is used to solve the formula (27).

The above optimization framework can be easily extended to the case of combining real IMU data, and the main difference lies in that there may be multiple IMU measurement data between two adjacent frames. Moreover, there is always some differences between the attitude of the camera and the attitude of the real IMU sensor, which cannot be simply considered to be consistent (the relative attitude of the camera and the real IMU sensor can be obtained by prior calibration). The set of IMU measurement data between frames i and i+1 is denoted as $\{(\hat{a}_{ij}, \hat{\omega}_{ij}, t_{ij}) | j = 1 \ldots n_i\}$, where $\hat{a}_{ij}, \hat{\omega}_{ij}$ and $t_{ij}$ are the $j_{th}$ linear acceleration, the rotation speed and the time stamp, respectively. The pre-integration technology in (T. Lupton and S. Sukkarieh. Visual-inertial-aided navigation for high-dynamic motion in built environments without initial conditions. IEEE Transactions on Robotics, 28(1):61-76, 2012) and (C. Forster, L. Carlone, F. Dellaert, and D. Scaramuzza. IMU preintegration on manifold for efficient visual-inertial maximum-a-posteriori estimation. In Robotics: Science and Systems, 2015) can be used to pre-integrate these IMU measurement data, and the components in (18) and (24) are replaced with the following formulas:

$$q_\Delta(\{(\hat{\omega}_{ij} - b_{\omega_i}, t_{ij})\}) \approx q_\Delta(\hat{\omega}_{ij} - \hat{b}_{\omega_i}, t_{ij}) + \frac{\partial q_\Delta}{\partial b_\omega}(b_\omega - \hat{b}_\omega)$$

$$p_\Delta(\{(\hat{a}_{ij} - b_{a_i}, \hat{\omega}_{ij} - b_{\omega_i}, t_{ij})\}) \approx$$
$$p_\Delta(\{(\hat{a}_{ij} - \hat{b}_{a_i}, \hat{\omega}_{ij} - \hat{b}_{\omega_i}, t_{ij})\}) + \frac{\partial p_\Delta}{\partial b_a}(b_a - \hat{b}_a) + \frac{\partial p_\Delta}{\partial b_\omega}(b_\omega - \hat{b}_\omega),$$

$$v_\Delta(\{(\hat{a}_{ij} - b_{a_i}, \hat{\omega}_{ij} - b_{\omega_i}, t_{ij})\}) \approx$$
$$v_\Delta(\{(\hat{a}_{ij} - \hat{b}_{a_i}, \hat{\omega}_{ij} - \hat{b}_{\omega_i}, t_{ij})\}) + \frac{\partial v_\Delta}{\partial b_a}(b_a - \hat{b}_a) + \frac{\partial v_\Delta}{\partial b_\omega}(b_\omega - \hat{b}_\omega)$$

where $\hat{b}_{a_i}$ and $\hat{b}_{\omega_i}$ are states of $b_{a_i}$ and $b_{\omega_i}$ when the pre-integration are performed. The Jacobian matrix is estimated in this state and the calculation only needs to be performed once. It is assumed here that the gravity component has been excluded, so $\hat{a}_{ij}$ only includes the acceleration generated by the motion. The sensor fusion algorithm in (N. Trawny and S. I. Roumeliotis. Indirect kalman filter for 3D attitude estimation. Technical Report 2005-002, University of Minnesota, Dept. of Comp. Sci. & Eng., March 2005) can be adopted to process original data obtained from accelerometers and gyroscopes so as to obtain the required data. In the experiment, the used IMU measurement data was from the filtered data in the iPhone 6.

3.2. When the result is medium (not good), there are still some matched features, most of which are still fully constrained points, and thus, a set of local homography matrices $H_{k \to i}^L$ can be estimated and a feature that has failed to be tracked is re-matched.

If the quality of the tracking of the global homography matrix and the specific three-dimensional plane homography matrix is not good, the obtained matching can be further used to estimate the local homography matrix. The present method uses a simple extraction strategy of multiple homography matrices to estimate a set of local homography matrices. Specifically, RANSAC method is used for $M_{k,i}$, and a best local homography matrix is estimated based on the number of the interior points satisfying the homography transformation and denoted as $H_{k \to i}^{L_1}$. The interior point satisfying $H_{k \to i}^{L_1}$ is removed from $M_{k,i}$, and then the same operation is performed on the remaining matchings to obtain $H_{k \to i}^{L_2}$. The above steps are repeated until the number of the remaining matchings is smaller than a certain number.

For a feature point which is not fully constrained and has no reliable three-dimensional position, $\pi(H_{k \to i}^{G} x_k^{h})$ is first directly used as the search position. If the tracking result is not good, a set of local homography matrices $H_{k \to i}^{L}$ is estimated according to the matching correspondences. For the unmatched features, trying is performed one by one in the search position $\{H_{k \to i}^{L_j} x_k | H_{k \to i}^{L_j} \in H_{k \to i}^{L}\}$. For each search position, its range is a r×r square area centered on the search position. For the points fully and un-fully constrained, r is 10 and 30 respectively.

The representation method of the multiple homography matrices in the present method can not only predict a good starting point but also correct perspective distortion. A homography matrix $H_{k \to i}$ is given, and the local block near $x_k$ in the key frame $F_k$ is aligned to the current frame $I_i$ through the formula $\kappa(y) = I_k(H_{k \to i}^{-1}(\pi(H_{k \to i} x_k^{h} + y^{h})))$ (7), $y^h$, where $\kappa(y)$ is an image gray scale for an offset of y relative to a center of the block. $y \in (-W/2, W/2) \times (-W/2, W/2)$, where W is a dimension of the image block and is set to be 8 in the experiment. For points belonging to the three-dimensional plane $P_j$, the plane homography matrix $H_{k \to i}^{P_j}$ obtained by the formula (2) is used for image block alignment. For other points, similar to the prediction of the search scope, the global homography matrix $H_{k \to i}^{G}$ is tried first, and if the tracking result is poor, the local homography matrix in the set $H_{k \to i}^{L}$ is tried one by one for features a feature that have failed to be tracked. Considering that a significant perspective change between adjacent frames is rare, it is not necessary to recalculate formula (7) for each input frame. The change of four vertices of each aligned image block may be calculated and formula (7) is recalculated only when the change exceeds a certain threshold.

Given a precise search range and an undistorted image block, the correspondence in the current frame can be easily tracked and obtained. Similar to PTAM, a value of a zero mean SSD is calculated for a FAST corner point extracted within a search area, and one FAST corner which has the minimum sero-mean SSD is selected when the offset is smaller than a certain threshold.

Figure 3:
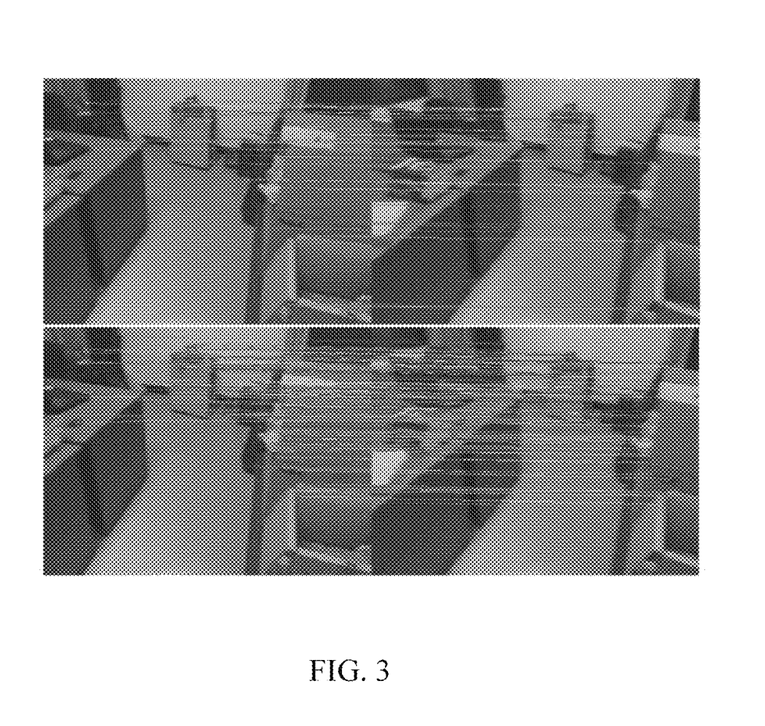
FIG. 3 is an effect diagram of a partial homography matrix for feature matching. Upper: 37 pairs of matching obtained by a global homography matrix and a specific plane homography matrix. Lower: 153 pairs of matching obtained by local homography matrix estimation.

In the present method, since a sufficient feature matching can generally be obtained by a global homography matrix and a specific plane homography matrix, it is rarely necessary to solve a local homography matrix. Only when there is a large parallax between the frames $F_k$ and $I_i$, and there are multiple different planes in the overlapping area, it is necessary to additionally try each local homography matrix for those abnormal points. As shown in FIG. 3, 37 pairs of matchings can be obtained by the global and specific plane homography matrices, and additional 153 pairs of matchings can be obtained by the local homography matrix.

3.3. When the result is poor, the relocating program introduced in the paper (G. Klein and D. W. Murray. Parallel tracking and mapping for small AR workspaces. In 6th IEEE/ACM International Symposium on Mixed and Augmented Reality, pages 225-234, 2007) is triggered. Once the relocating is successful, the relocated key frame is used for global homography matrix tracking, and then the feature tracking is performed again.

4. Waking up the background thread if a new key frame is selected.

4.1. A new key frame and a newly triangulated three-dimensional point are added for extending the global map, and a local bundle adjustment is adopted for optimization. After that, the existing three-dimensional plane is extended and the newly added three-dimensional point is given to the existing plane, or a new three-dimensional plane is extracted from the newly added three-dimensional point.

Similar to the paper (G. Klein and D. W. Murray. Parallel tracking and mapping for small AR workspaces. In 6th IEEE/ACM International Symposium on Mixed and Augmented Reality, pages 225-234, 2007), the present method uses local and global bundle adjustment methods in the background to optimize the map and camera orientation of the key frame. For each three-dimensional point in the new key frame $F_k$, the maximum ray angle with respect to the existing key frame is first calculated using formula (8). If $\max_i \alpha(i,k) \geq \delta_\alpha$ and the three-dimensional coordinates are successfully triangulated, the point is marked as fully constrained. The existing three-dimensional plane visible in frame $F_k$ is then extended with a new and fully constrained three-dimensional point X belonging to the plane. In order to determine whether a three-dimensional point X belongs to the plane P, it is only needed to check the distance $|n^T X + d|$ from the point to the plane. However, satisfying the plane equation is only a necessary condition rather than a sufficient condition, due to the fact that the plane equation does not contain plane boundary information. Suppose that the points belonging to the same plane are close to each other in space, only a point having its adjacent point on the plane is checked when checking the point-to-plane distance. The neighborhood relationship is defined by Delaunay triangulation of the two-dimensional feature in the key frame $F_k$. When a three-dimensional point satisfies the following three conditions, the point is added to the set $V_P$ of the plane P: 1) X is not assigned to any plane, 2) X is connected with another point in $V_P$, and 3) $|n^T X + d| < \delta_P$. In the experiment, setting $\delta_P = 0.01 d_k$, where $d_k$ is an average depth of the key frame $F_k$.

Figure 4:
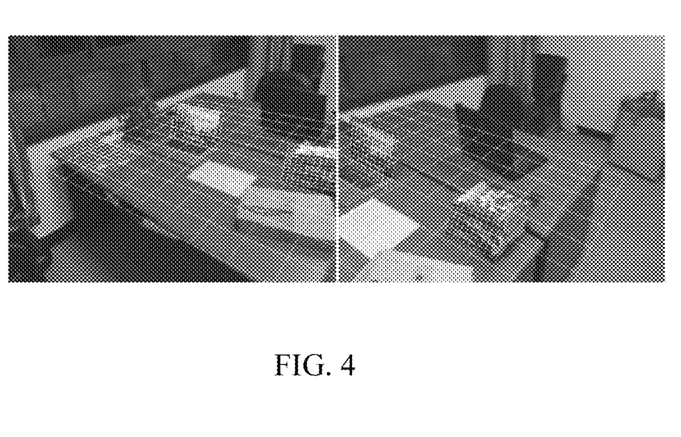
FIG. 4 is a three-dimensional plane extracted and obtained by fitting the found three-dimensional points.

RANSAC algorithm (M. A. Fischler and R. C. Bolles. Random sample consensus: A paradigm for model fitting with applications to image analysis and automated cartography. Commun. ACM, 24(6): 381-395, 1981) is adopted to extract a new three-dimensional plane. In each iteration of the RANSAC, three connected points are randomly sampled to initialize a set of three-dimensional interior points $V_P$. It is assumed that the three-dimensional plane P is generated by $V_P$. Then, an inner loop which iteratively adjusts plane extension and optimization begins. In each internal iteration, the distance from those three-dimensional points X, which are connected to points in the set $V_P$, to the plane is checked. If $|n^T X + d| < \delta_P$, X is added to $V_P$. After that, the plane is optimized by the minimization formula for all points in $V_P$:

$$\underset{P}{\mathrm{argmin}} \sum_{X \in V_P} (n^T X + d)^2, \qquad (28)$$

and an attempt to further extend $V_P$ is made. When $|V_P| < 30$, P and $V_P$ are discarded. In order to avoid marking one point to multiple planes, the extracted planes are sorted in a descending order according to the number of the relevant three-dimensional points after each RANSAC operation. The set of the sorted interior points is denoted as $\{V_{P_i}|i=1\ldots N_P\}$. Starting from the first one, for any $V_{P_i}$, if a three-dimensional point $X \in V_{P_i}$ also exists in the previous set of the plane points $V_{P_j}(j<i)$, this point is to be removed from $V_{P_i}$. FIG. 4 is illustrated as the extracted three-dimensional plane.

By adding a point-to-plane constraint, parameters of the three-dimensional plane can be optimized in a global bundle adjustment. The present method uses a LM (Levenberg Marquart) algorithm to minimize the following energy function so as to jointly optimize all camera orientations, three-dimensional points and three-dimensional planes of the key frames:

$$\underset{C,X,P}{\operatorname{argmin}} \sum_{i=1}^{N_F} \sum_{j \in V_i} \|\pi(K(R_i(X_j - p_i))) - x_{ij}\|_{\delta_x} + \sum_{i=1}^{N_P} \sum_{j \in V_{P_i}} \|n_i^T X_j + d_j\|_{\delta_P}. \quad (29)$$

It should be noted that other functions of the present method are also solved by the LM algorithm except (3), (5) and (27).

4.2. Detecting a loop by matching features of a new key frame with those of an existing key frame.

For the loop detection, the same algorithm as the relocation is used to find feature matching of the new key frame with the previous frame, and then a closed circulation loop is obtained through the global bundle adjustment.

4.3. Performing a bundle adjustment on the global map.

Figure 5A:
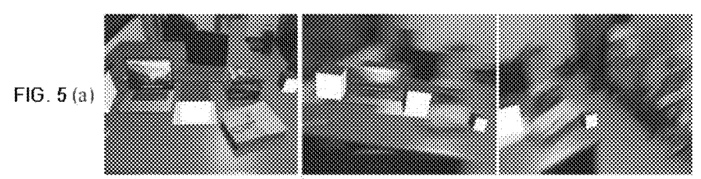
Figure 5B:
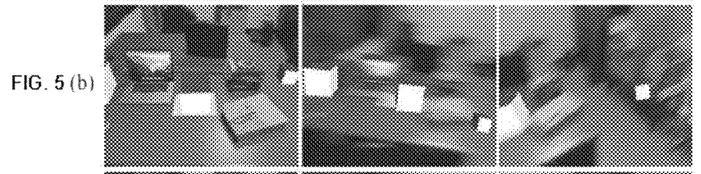
Figure 5C:
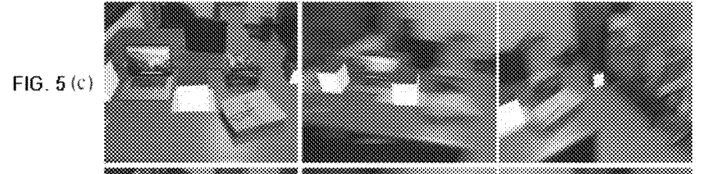
Figure 5D:
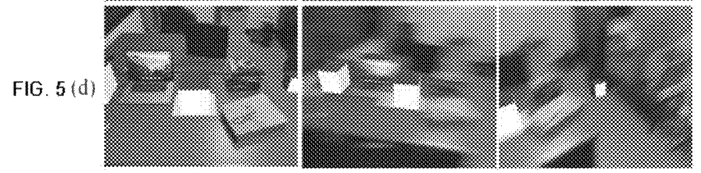
Figure 5E:
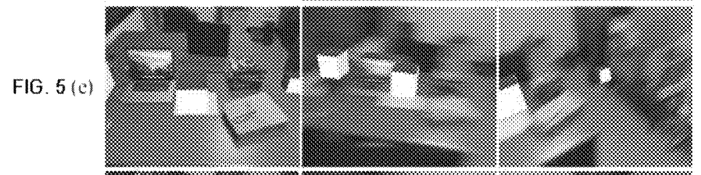
Figure 5F:
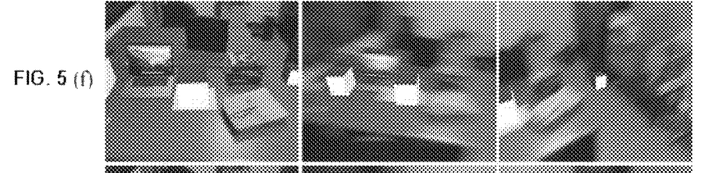
Figure 5G:
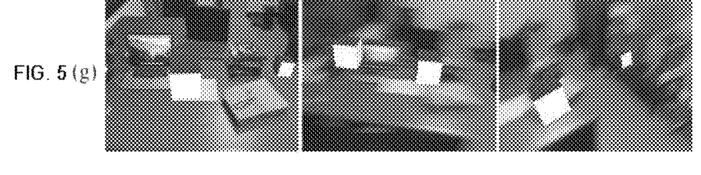

In the experiment, effects of the method proposed by the present disclosure in four different settings are first compared (FIG. 5): 1) a case where there is no a priori motion constraint; 2) a case where it is directly set that $\hat{a}_i=0$, $\hat{\omega}_i=0$; 3) a case where the rotation speed is estimated; and 4) a case where the actual IMU data is incorporated. The results indicate that in the cases of 1) and 2), the present method is similar to results of other methods, in both of which the results of tracking failure frequently occur during strong rotation and rapid motion, as shown in FIGS. 5(a) and (b). In the case of 3), the present method can reliably recover the camera orientation even during fast motion and severe blur, as shown in FIG. 5(c). When the actual IMU data is incorporated, the robustness is further improved, as shown in FIG. 5(d). In addition, the results of ORB-SLAM, PTAM, and LSD-SLAM are shown in FIGS. 5(e), (f), and (g), in which severe drift occurs due to strong rotation, rapid motion and severe blurring. Then, the effect of the present method was compared with those of other methods in the outdoor large scene. The result of the present method again demonstrates the superiority of the present method. In the absence of actual IMU data, the result of the present method can still recover and obtain a reliable camera orientation, and when there is actual IMU data, the effect is more reliable.

In addition, we have applied this method in an application on a mobile terminal and tested it. When the user is using the application, a scene is shot with a mobile phone, and then a plurality of three-dimensional virtual furniture models are inserted into the room for viewing the effect of the furniture placement. We could not know the actual size of the three-dimensional structure recovered by the Monocular Simultaneous Localization and Mapping (SLAM) method. In order to ensure that the three-dimensional furniture model has the right size when being inserted, a method is needed for accurate estimation. However, it may be difficult to estimate the exact size in time based on the noisy IMU data provided by the mobile phone. It is more reliable to use a calibration of a known size. In the application, the user needs to use a sheet of A4 paper, aiming a center of a camera at the paper at the beginning of the application. Our augmented reality system automatically uses camera orientation estimates to automatically detect four sides of the paper. After initialization, the user can download different three-dimensional models in a list and put them into the scene.

What is claimed is:

1. A method for simultaneous localization and mapping, comprising steps of:
    1) a foreground thread processing a video stream in real time, and extracting a feature point for any current frame ($I_i$);
    2) tracking a set of global homography matrices ($H_i^G$);
    3) using a global homography matrix and a specific plane homography matrix to track a three-dimensional point so as to obtain a set of 3D-2D correspondences required by a camera attitude estimation; and
    4) evaluating quality of the tracking according to a comparison of a number of the tracked feature points and a predefined threshold and classifying the quality into a first grade, a second grade and a third grade, wherein the quality of the tracking indicated by the first grade is better than that indicated by the second grade, and the quality of the tracking indicated by the second grade is better than that indicated by the third grade;
    4.1) when the quality of the tracking is classified as the first grade, performing extension and optimization of a local map, and then determining whether to select a new key frame;
    4.2) when the quality of the tracking is classified as the second grade, estimating a set of local homography matrices ($H_{k \to i}^L$), and re-matching a feature that has failed to be tracked; and
    4.3) when the quality of the tracking is classified as the third grade, triggering a relocating program, and once the relocating is successful, performing a global homography matrix tracking using a key frame that is relocated, and then performing tracking of features again,
    wherein in step 4.1), when it is determined to select a new key frame, the selected new key frame wakes up a background thread for global optimization, the new key frame and a new triangulated three-dimensional point is added for extending a global map, and a local bundle adjustment is adopted for optimization; then an existing three-dimensional plane is extended, the added new three-dimensional point is given to the existing plane, or a new three-dimensional plane is extracted from the added new three-dimensional point; subsequently, a loop is detected by matching the new key frame with an existing key frame; and finally, a global bundle adjustment is performed on the global map.

2. The method for simultaneous localization and mapping according to claim 1, wherein the step 2) comprises:
    for two adjacent frames of images, estimating a global homography transformation from a previous frame ($I_{i-1}$) to a current frame ($I_i$) by directly aligning the previous frame of image with the current frame of image as:

$$H_{(i-1) \to i}^G = \underset{H}{\operatorname{argmin}} \sum_{x \in \Omega} \|\tilde{I}_{i-1}(x) - \tilde{I}_i(\pi(\tilde{H}x^h))\|_{\delta_I},$$

where $\tilde{I}_{i-1}$ and $\tilde{I}_{i-1}$ are small blurred images of the previous frame ($I_{i-1}$) and the current frame ($I_i$) respectively, $\Omega$ is a small image domain, a superscript h indicates that a vector is a homogeneous coordinate, a tilde in $\tilde{H}$ indicates that a homography matrix (H) is converted from a source image space to a small image space, $\delta_I$ and $\|\cdot\|_\delta$ represents a Huber function; and a calculation method is expressed as the following formula:

$$\|e\|_\delta = \begin{cases} \frac{\|e\|_2^2}{2\delta} & \text{if } \|e\|_2 \leq \delta \\ \|e\|_2 - \frac{\delta}{2} & \text{otherwise.} \end{cases} \quad (4)$$

for each key frame ($F_k$), which has an initial solution to the global homography matrix ($H_{k \to (i-1)}^G$) of the previous frame ($I_{i-1}$), using a set of feature matchings (denoted as $M_{k,i-1} = \{(x_k, x_{i-1})\}$) between the hey frames ($F_k$) and the previous frame ($I_{i-1}$) to determine a set of key frames which has an overlap with the previous frame ($I_{i-1}$) and is denoted as $K_{i-1}$, selecting five key frames satisfying that $|M_{k,i-1}| > 20$ and $|M_{k,i-1}|$ is maximized, optimizing an initial solution of the global homography matrix ($H_{k \to (i-1)}^G$) for each key frame ($F_k$) in $K_{i-1}$:

$$H_{k \to (i-1)}^G = \underset{H}{\arg\min} \sum_{x \in \Omega} \left( \left\| \tilde{F}_k(x) - \tilde{I}_{i-1}(\pi(\tilde{H}x^h)) \right\|_{\delta_I} + \sum_{(x_k, x_{i-1}) \in M_{k,i-1}} \left\| \pi(\tilde{H}x_k^h) - x_{i-1} \right\|_{\delta_x} \right).$$

obtaining the global homography transformation $H_{k \to i}^G = H_{(i-1) \to i}^G H_{k \to (i-1)}^G$ from the key frame ($F_k$) to the current frame ($I_i$) through transitivity.

3. The method for simultaneous localization and mapping according to claim 1, wherein the step 3) comprises:
for a feature point which is fully constrained and has a reliable three-dimensional position, determining a search position by predicting a camera orientation ($C_i$) of a current frame predicting the camera orientation ($C_i$) using the global homography matrix ($H_i^G$), denoting a two-dimensional feature point of a frame $F_k \in K_{i-1}$ as $x_k$ and denoting a corresponding three-dimensional point as $X_k$, obtaining a three-dimensional to two-dimensional correspondence ($X_k, x_i$) through a formula $x_i = \pi(H_{k \to i}^G x_k^h)$, in which a set of all the three-dimensional to two-dimensional correspondences is denoted as $V_{C_i} = \{(X_j, x_j)\}$, and predicting a camera position by solving $$\underset{C_i}{\arg\min} \sum_{(X_j, x_j) \in V_{C_i}} \|\pi(K(R_i(X_j - p_i))) - x_j\|_{\delta_x} R_i; \quad (6)$$

and for a feature point which is not fully constrained and has no reliable three-dimensional position, first of all, directly using $\pi(H_{k \to i}^G x_k^h)$ as the search position, and obtaining a set of local homography matrices ($H_{k \to i}^L$) according to estimation of matched correspondence if the quality of the tracking is evaluated as medium, while for an unmatched feature, trying one by one in the search position $\{H_{k \to i}^{L_j} x_k | H_{k \to i}^{L_j} \in H_{k \to i}^L\}$, in which for each search position, its range is a r×r square area centered on the search position and r is 10 and 30 respectively for points fully constrained and points not fully constrained; and given a homography matrix ($H_{k \to i}$), calculating a change of four vertices of each aligned image block, aligning a local block near $x_k$ in the key frame ($F_k$) to the current frame ($I_i$) through a formula $\kappa(y) = I_k(H_{k \to i}^{-1}(\pi H_{k \to i} x_k^h + y^h)))$ (7) only when the change exceeds a certain threshold$^h$, wherein $\kappa(y)$ is an image gray scale for an offset of y relative to a center of the block, and $y \in (-W/2, W/2) \times (-W/2, W/2)$, where W is a dimension of the image block; and calculating a value of a zero-mean SSD for a FAST corner point extracted within a search area, and selecting one FAST corner which has the minimum zero-mean SSD when the offset is smaller than a certain threshold.

4. The method for simultaneous localization and mapping according to claim 1, wherein said performing extension and optimization of the local map in step 4.1) comprises:
for one two-dimensional feature ($x_k$) of the key frame ($F_k$), calculating a ray angle according to a formula of $$\alpha(i,k) = \arccos\left(\frac{r_k^T r_i}{\|r_k\| \cdot \|r_i\|}\right) \quad (8)$$

once a corresponding feature ($x_i$) is found in a current frame ($I_i$), where $r_j = R_j^T K^{-1} x_j^h$; if $\alpha(i,k) \geq \delta_\alpha$, obtaining a three-dimensional position X using a triangulation algorithm, and otherwise, specifying an average depth $d_k$ of the key frame $F_k$ for $x_k$ to initialize X, $X = d_k K^{-1} x_k^h$, and optimizing X according to a formula of $\arg\min \|\pi(KR_k(X-p_k)) - x_k\|_2^2 + \|\pi(KR_i(X-p_i)) - x_i\|_2^2$ (9)$\delta_\alpha \rho_i$; selecting a local window, fixing a camera orientation first, individually optimizing each three-dimensional point position ($X_i$) by solving $$\underset{X_i}{\arg\min} \sum_{j \in V_{X_i}} \|\pi(K(R_j(X_i - p_i))) - x_{ij}\|_{\delta_x}, \quad (10)$$

where $V_{x_i}$ is a set of frame number indices of the key frame and a frame where the three-dimensional point position ($X_i$) is observed in a sliding window, and then fixing the three-dimensional point position and optimizing all camera orientations in the local window.

5. The method for simultaneous localization and mapping according to claim 4, wherein said fixing the three-dimensional point position and optimizing all camera orientations in the local window comprises:
assuming that there is already a linear acceleration $\hat{a}$ and a rotation speed $\hat{\omega}$ measured in a local coordinate system, and a real linear acceleration is $a = \hat{a} - b_a + n_a$, a real rotation speed is $\omega = \hat{\omega} - b_\omega + n_\omega$, $n_a \sim N(0, \sigma_{n_a}^2 I)$, $n_\omega \sim N(0, \sigma_{n_\omega}^2 I)$ are Gaussian noise of inertial measurement data, I is a 3×3 identity matrix, $b_a$ and $b_\omega$ are respectively offsets of the linear acceleration and the rotation speed with time, extending a state of a camera motion to be: $s = [q^T p^T v^T b_a^T b_\omega^T]^T$, where v is a linear velocity in a global coordinate system, a continuous-time motion equation of all states is:

$$\dot{q} = \frac{1}{2}\Omega(\omega)q, \dot{p} = v, \dot{v} = R^T a, \dot{b}_a = w_a, \dot{b}_\omega = w_\omega, \quad (15)$$

where $$\Omega(\omega) = \begin{bmatrix} -[\omega]_x & \omega \\ -\omega^T & 0 \end{bmatrix}, \quad (5)$$

$[\bullet]_{102}$ represents a skew symmetric matrix, $w_a \sim N(0, \sigma_{w_a}^2 I)$ and $w_\omega \sim N(0, \sigma_{w_\omega}^2 I)$ represent random walk processes, and a discrete-time motion equation of a rotational component is:

$$q_{i+1} = q_\Delta(\omega_i, t_{\Delta_i}) \otimes q_i \quad (17),$$

where $$q_\Delta(\omega, t_\Delta) = \begin{cases} \begin{bmatrix} \frac{\omega}{|\omega|} \sin\left(\frac{|\omega|}{2} t_\Delta\right) \\ \cos\left(\frac{|\omega|}{2} t_\Delta\right) \end{bmatrix} & \text{if } |\omega| > \varepsilon_\omega \\ \begin{bmatrix} \frac{|\omega|}{2} t_\Delta \\ 1 \end{bmatrix} & \text{otherwise} \end{cases}, \quad (18)$$

$t_{66_i}$ is a time interval between two adjacent key frames i and i+1, $\otimes$ is a quaternion multiplication operator, $\varepsilon_\omega$ is a small value that prevents zero division; and approximating a real value of $q_\Delta(\omega_i, t_{\Delta_i})$ by a formula of $$q_\Delta(\omega_i, t_{\Delta_i}) \approx \begin{bmatrix} \frac{\tilde{\theta}}{2} \\ 1 \end{bmatrix} \otimes q_\Delta(\hat{\omega}_i - b_{\omega_i}, t_{\Delta_i}), \quad (19)$$

where $\tilde{\theta}$ is a 3×1 error vector, yielding:

$$\tilde{\theta} \approx 2[q_\Delta(\hat{\omega}_i - b_{\omega_i} + n_\omega, t_{\Delta_i}) \otimes q_\Delta^{-1}(\hat{\omega}_i - b_{\omega_i}, t_{\Delta_i})]_{1:3} \approx 2 G_\omega n_\omega \quad (20),$$

where $G_\omega$ is a Jacobian matrix associated with noise $n_\omega$, further yielding $$\tilde{\theta} \approx 2[q_{i+1} \otimes q_i^{-1} \otimes q\Delta^{-1}(\hat{\omega}_i - b_{\omega_i}, t_{\Delta_i})]_{1:3} \quad (21),$$

and defining a cost function and a covariance of the rotational component as:

$$e_q(q_i, q_{i+1}, b_{\omega_i}) = [q_{i+1} \otimes q_i^{-1} \otimes q_\Delta^{-1}(\hat{\omega}_i - b_{\omega_i}, t_{\Delta_i})]_{1:3},$$
$$\Sigma_q = \sigma_{n_\omega}^2 G_\omega G_\omega^T \quad (22);$$

defining discrete-time motion equations, cost functions and covariance for other components as:

$$p_{i+1} = p_i + v_i t_{\Delta_i} + R_i^T p_\Delta(a_i, t_{\Delta_i}) \quad (25)$$

$$v_{i+1} = v_i + R_i^T v_\Delta(a_i, t_{\Delta_i})$$

$$b_{a_{i+1}} = b_{a_i} + w_a t_{\Delta_i}$$

$$b_{\omega_{i+1}} = b_{\omega_i} + w_\omega t_{\Delta_i}$$

$$e_p(q_i, p_i, p_{i+1}, v_i, b_{a_i}) = R_i(p_{i+1} - p_i - v_i t_{\Delta_i}) - p_\Delta(\hat{a}_i - b_{a_i}, t_{\Delta_i})$$

$$e_v(q_i, v_i, v_{i+1}, v_i, b_{a_i}) = R_i(v_{i+1} - v_i) - v_\Delta(\hat{a}_i - b_{a_i}, t_{\Delta_i})$$

$$e_{b_a}(b_a, b_{a_{i+1}}) = b_{a_{i+1}} - b_{a_i}$$

$$e_{b_\omega}(b_{\omega_i}, b_{\omega_{i+1}}) = b_{\omega_{i+1}} - b_{\omega_i}$$

$$\Sigma_p = \frac{1}{4} \sigma_{n_a}^2 t_{\Delta_i}^4 I$$

$$\Sigma_v = \sigma_{n_a}^2 t_{\Delta_i}^2 I$$

-continued $$\Sigma_{b_a} = \sigma_{w_a}^2 t_{\Delta_i}^2 I$$

$$\Sigma_{b_\omega} = \sigma_{w_\omega}^2 t_{\Delta_i}^2 I,$$

where $$p_\Delta(a, t_\Delta) = \frac{1}{2} a t_\Delta^2, \; v_\Delta(a, t_\Delta) = a t_\Delta; \quad (24)$$

defining an energy function of all motion states $s_1 \ldots s_l$ in the sliding window as:

$$\underset{s_1 \ldots s_l}{\operatorname{argmin}} \sum_{i=1}^{l} \sum_{j \in V_{c_i}} \|\pi(K(R_i(X_j - p_i))) - x_{ij}\| + \sum_{i=1}^{l-1} \|e_q(q_i, q_{i+1}, b_{\omega_i})\|_{\Sigma_q}^2 + \quad (26)$$

$$\sum_{i=1}^{l-1} \|e_p(q_i, p_i, p_{i+1}, v_i, b_{a_i})\|_{\Sigma_p}^2 + \sum_{i=1}^{l-1} \|e_v(q_i, v_i, v_{i+1}, v_i, b_{a_i})\|_{\Sigma_v}^2 +$$

$$\sum_{i=1}^{l-1} \|e_{b_a}(b_a, b_{a_{i+1}})\|_{\Sigma_{b_a}}^2 + \sum_{i=1}^{l-1} \|e_{b_\omega}(b_{\omega_i}, b_{\omega_{i+1}})\|_{\Sigma_{b_\omega}}^2,$$

where $l$ is a size of the sliding window and $\|e\|_\Sigma^2 = e^T \Sigma^{-1} e$ is a square of a Mahalanobis distance;

for a case without an IMU sensor, setting $\hat{a}_i = 0$, obtaining one optimal angular velocity by using the feature matching to align successive frame images:

$$\hat{\omega}_i = \underset{\omega}{\operatorname{argmin}} \left( \sum_{x \in \Omega} \|\tilde{I}_i(x) - \tilde{I}_{i+1}(\pi(KR_\Delta(\omega, t_{\Delta_i}) K^{-1} x^h))\|_{\delta_I} + \right. \quad (27)$$

$$\left. \sum_{(x_i, x_{i+1}) \in M_{i,i+1}} \frac{1}{\delta_X} \|\pi(KR_\Delta(\omega, t_{\Delta_i}) K^{-1} x_i^h) - x_{i+1}\|_2^2 \right),$$

where $R_\Delta(\omega, t_\Delta)$ is a rotation matrix of the formula (18), $M_{i,i+1}$ is a set of feature matchings between frames i and i+1, denoting a set of IMU measurement data between frames i and i+1 as $\{(\hat{a}_{ij}, \hat{\omega}_{ij}, t_{ij}) | = 1 \ldots n_i\}$ if there is real IMU measurement data, where $\hat{a}_{ij}$, $\hat{\omega}_{ij}$ and $t_{ij}$ are respectively a $j_{th}$ linear acceleration, a rotation speed and a timestamp; and using a pre-integration technique to pre-integrate the IMU measurement data, and using the following formulas to replace components in (18) and (24):

$$q_\Delta(\{(\hat{\omega}_{ij} - b_{\omega_i}, t_{ij})\}) \approx q_\Delta(\hat{\omega}_{ij} - \hat{b}_{\omega_i}, t_{ij}) + \frac{\partial q_\Delta}{\partial b_\omega}(b_\omega - \hat{b}_\omega)$$

$$p_\Delta(\{(\hat{a}_{ij} - b_{a_i}, \hat{\omega}_{ij} - b_{\omega_i}, t_{ij})\}) \approx$$

$$p_\Delta(\{(\hat{a}_{ij} - \hat{b}_{a_i}, \hat{\omega}_{ij} - \hat{b}_{\omega_i}, t_{ij})\}) + \frac{\partial p_\Delta}{\partial b_a}(b_a - \hat{b}_a) + \frac{\partial p_\Delta}{\partial b_\omega}(b_\omega - \hat{b}_\omega)$$

$$v_\Delta(\{(\hat{a}_{ij} - b_{a_i}, \hat{\omega}_{ij} - b_{\omega_i}, t_{ij})\}) \approx$$

$$v_\Delta(\{(\hat{a}_{ij} - \hat{b}_{a_i}, \hat{\omega}_{ij} - \hat{b}_{\omega_i}, t_{ij})\}) + \frac{\partial v_\Delta}{\partial b_a}(b_a - \hat{b}_a) + \frac{\partial v_\Delta}{\partial b_\omega}(b_\omega - \hat{b}_\omega),$$

where $\hat{b}_{a_i}$ and $\hat{b}_{\omega_i}$ are states of $b_{a_i}$ and $b_{\omega_i}$ when being pre-integrated.

6. The method for simultaneous localization and mapping according to claim 4, wherein the global optimization by the background thread comprises:

for each three-dimensional point in the new key frame ($F_k$), calculating a maximum ray angle with respect to the existing key frame using the formula (8) first; marking the point as a fully constrained three-dimensional point if $\max_i \alpha(i,k) \geq \delta_\alpha$ and three-dimensional coordinates are successfully triangulated; then extending the existing three-dimensional plane visible in the key frame ($F_k$) by the new and fully constrained three-dimensional point X belonging to the plane; defining a neighborhood relationship by performing Delaunay triangulation on the two-dimensional feature in the key frame ($F_k$); when a three-dimensional point satisfies the following three conditions at the same time, adding this point to a set $V_P$ of the plane P: 1) X is not assigned to any plane, 2) X is connected with another point in $V_P$, and 3) $|n^T X + d| < \delta_P$, where $d_k$ is the average depth of the key frame ($F_k$); adopting a RANSAC algorithm to extract a new three-dimensional plane; randomly sampling three connected points in each iteration to initialize a set $V_P$ of three-dimensional interior points; adopting SVD to recover a three-dimensional plane parameter P, and then starting an inner loop which iteratively adjusts extension and optimization of the plane; for each internal iteration, checking a distance from the three-dimensional points X, which are connected to the points in the set $V_P$, to the plane; if $|n^T X + d| < \delta_P$, adding X to $V_P$, optimizing the plane by a minimization formula for all points in $V_P$:

$$\operatorname*{argmin}_{P} \sum_{X \in V_P} (n^T X + d)^2, \tag{28}$$

and iteratively extending $V_P$ by repeating the above steps; and when $|V_P| < 30$, discarding P and $V_P$; sorting the extracted planes in a descending order according to a number of relevant three-dimensional points, and denoting a set of the sorted interior points as $\{V_{P_i} | i=1 \ldots N_P\}$; starting from a first one, for any $V_{P_i}$, if a three-dimensional point $X \in V_{P_i}$, also exists in a previous set of plane points $V_{P_j}(j<i)$, removing this point from $V_{P_i}$; and optimizing the three-dimensional plane parameter by adding a point-to-plane constraint in the global bundle adjustment, $$\operatorname*{argmin}_{C,X,P} \sum_{i=1}^{N_F} \sum_{j \in V_i} \|\pi(K(R_i(X_j - p_i))) - x_{ij}\|_{\delta_x} + \sum_{i=1}^{N_P} \sum_{j \in V_{P_i}} \|n_i^T X_j + d_j\|_{\delta_P}. \tag{29}$$

7. The method for simultaneous localization and mapping according to claim 1, further comprising an initialization step of placing a virtual object on a specific plane of a real scene in a real size:

initializing the tracking using a planar marker of a known size, providing a world coordinate system at a center of the planar marker, adopting n three-dimensional points $X_i$, $i=1, \ldots, n$ uniformly along an edge of the planar marker, and recovering an orientation (R,t) of a camera in an initial frame by solving the following optimization equation:

$$\operatorname*{argmin}_{R,t} \sum_{i=1}^{n} \|I(\pi(RX_i + t)) - I(\pi(R(X + \delta X_i^{\|}) + t))\|^2 + \tag{30}$$

$$\|I(\pi(RX_i + t)) - I(\pi(R(X + \delta X_i^{\perp}) + t)) + 255\|^2,$$

where directions of $\delta X_{\|}$ and $\delta X_{\perp}$ are respectively a direction along a tangent at $X_i$ of the edge and a vertically inward direction at $X_i$, and lengths thereof ensure that distances between projection points of $X + \delta X_i^{\|}$ and $X + \delta X_i^{\perp}$ on the image and a projection point of $X_i$ are one pixel; constructing a 4-layer pyramid for the image by adopting a coarse-to-fine strategy to enlarge a convergence range, starting from a top layer, and using an optimized result as an initial value of a lower layer optimization.

\* \* \* \* \*